(12) United States Patent
Shen et al.

(10) Patent No.: US 10,592,610 B1
(45) Date of Patent: *Mar. 17, 2020

(54) SEMANTIC GRAPH TRAVERSAL FOR RECOGNITION OF INFERRED CLAUSES WITHIN NATURAL LANGUAGE INPUTS

(71) Applicant: Babylon Partners Limited, London (GB)

(72) Inventors: April Tuesday Shen, London (GB); Francesco Moramarco, London (GB); Nils Hammerla, London (GB); Pietro Cavallo, London (GB); Olufemi Awomosu, London (GB); Aleksandar Savkov, London (GB); Jack Flann, London (GB)

(73) Assignee: Babylon Partners Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,399

(22) Filed: Jul. 8, 2019

Related U.S. Application Data

(63) Continuation of application No. 16/261,970, filed on Jan. 30, 2019, now Pat. No. 10,387,575.

(51) Int. Cl.
*G06F 17/27* (2006.01)

(52) U.S. Cl.
CPC ........ *G06F 17/2785* (2013.01); *G06F 17/274* (2013.01); *G06F 17/279* (2013.01); *G06F 17/2755* (2013.01); *G06F 17/2775* (2013.01)

(58) Field of Classification Search
CPC ............ G06F 17/2755; G06F 17/2775; G06F 17/2785; G06F 17/279
See application file for complete search history.

(56) References Cited

U.S. PATENT DOCUMENTS

| 5,438,512 A | * | 8/1995 | Mantha | G06F 17/211 704/1 |
| 5,758,024 A | * | 5/1998 | Alleva | G06F 17/2715 704/254 |

(Continued)

OTHER PUBLICATIONS

Artzi, Y. and L. Zettlemoyer, Bootstrapping Semantic Parsers from Conversations. In EMNLP, 2001.

(Continued)

*Primary Examiner* — Eric Yen
(74) *Attorney, Agent, or Firm* — McDermott Will & Emery LLP

(57) ABSTRACT

Embodiments described herein provide a more flexible, effective, and computationally efficient means for determining multiple intents within a natural language input. Some methods rely on specifically trained machine learning classifiers to determine multiple intents within a natural language input. These classifiers require a large amount of labelled training data in order to work effectively, and are generally only applicable to determining specific types of intents (e.g., a specifically selected set of potential inputs). In contrast, the embodiments described herein avoid the use of specifically trained classifiers by determining inferred clauses from a semantic graph of the input. This allows the methods described herein to function more efficiently and over a wider variety of potential inputs.

20 Claims, 8 Drawing Sheets

(56) References Cited

U.S. PATENT DOCUMENTS

| | | | | |
|---|---|---|---|---|
| 6,654,731 | B1* | 11/2003 | Mahesh | G06F 17/2795 706/45 |
| 7,383,169 | B1* | 6/2008 | Vanderwende | G06F 17/2785 704/9 |
| 8,706,477 | B1* | 4/2014 | Diaconescu | G06F 17/271 704/9 |
| 8,712,931 | B1* | 4/2014 | Wahlen | G06F 3/0237 706/12 |
| 9,110,852 | B1* | 8/2015 | Lerman | G06F 17/15 |
| 10,387,888 | B2* | 8/2019 | Sapoznik | G06Q 30/016 |
| 2003/0115039 | A1* | 6/2003 | Wang | G06F 17/271 704/4 |
| 2004/0117449 | A1* | 6/2004 | Newman | G06F 16/284 709/206 |
| 2005/0004790 | A1* | 1/2005 | Wu | G06F 17/2715 704/9 |
| 2005/0256700 | A1* | 11/2005 | Moldovan | G06F 17/271 704/9 |
| 2009/0132233 | A1* | 5/2009 | Etzioni | G06F 17/28 704/3 |
| 2009/0240714 | A1* | 9/2009 | Keith | G06F 17/2785 |
| 2012/0179642 | A1* | 7/2012 | Sweeney | G06F 17/2785 706/55 |
| 2016/0048504 | A1* | 2/2016 | Narayanan | G06F 17/2755 704/9 |
| 2016/0283525 | A1* | 9/2016 | Farenden | G06F 16/18 |
| 2016/0328467 | A1* | 11/2016 | Zou | G06F 17/2735 |
| 2017/0161242 | A1* | 6/2017 | Clark | G06F 17/2264 |
| 2018/0024989 | A1* | 1/2018 | Bharti | G06F 17/2775 704/9 |

OTHER PUBLICATIONS

Baker, C. F., C. J. Fillmore, and J. B. Lowe, 1998. The Berkeley FrameNet Project. In COLING.

Bobrow, D. G., R. M. Kaplan, M. Kay, D. A. Norman, H. Thompson, and T. Winograd, 1977. GUS, a frame-driven dialog system. Artificial Intelligence, 8(2):155-173.

Bocklisch, T., J. Faulkner, N. Pawlowski, and A. Nichol 2017. Rasa: Open Source Language Understanding and Dialogue Management. NIPS Conversational AI Workshop.

Bordes, A., Y.-L. Boureau, and J. Weston, 2017. Learning End-To-End Goal-Oriented Dialog. ICLR.

Cer, D., Y. Yang, S.-Y. Kong, N. Hua, N. Limtiaco, R. S. John, N. Constant, M. Guajardo-Céspedes, S. Yuan, C. Tar, Y.-H. Sung, B. Strope, and R. Kurzweil, 2018. Universal Sentence Encoder.

Dong, L. and M. Lapata, 2016. Language to Logical Form with Neural Attention. In ACL, pp. 33-43.

Gildea, D. and D. Jurafsky, 2002. Automatic Labeling of Semantic Roles. Computational Linguistics.

Goddeau, D., H. Meng, J. Polifroni, S. Seneff, and S. Busayapongchaiy, 1996. A Form-Based Dialogue Manager for Spoken Language Applications. In Proceeding of Fourth International Conference on Spoken Language Processing.

Goldwater, S., D. Jurafsky, and C. D. Manning, 2010. Which words are hard to recognize? Prosodic, lexical, and disfluency factors that increase speech recognition error rates. Speech Communication.

Jurafsky, D. and J. H. Martin, 2017. Speech and Language Processing: An Introduction to Natural Language Processing, Computational Linguistics, and Speech Recognition (Third Edition draft).

Kate, R. J. and R. J. Mooney, 2006. Using String-Kernels for Learning Semantic Parsers. In COLING/ACL, pp. 913-920.

Kiros, R., Y. Zhu, R. Salakhutdinov, R. S. Zemel, A. Torralba, R. Urtasun, and S. Fidler, 2015. Skip-Thought Vectors. NIPS.

Kumar, A., A. Gupta, J. Chan, S. Tucker, B. Hoffmeister, M. Dreyer, S. Peshterliev, A. Gandhe, D. Filiminov, A. Rastrow, C. Monson, and A. Kumar 2017. Just ASK: Building an Architecture for Extensible Self-Service Spoken Language Understanding. NIPS Conversational AI Workshop.

Liang, P., M. I. Jordan, and D. Klein, 2013. Learning Dependency-Based Compositional Semantics. Computational Linguistics.

Liu, B., G. Tür, D. Hakkani-Tür, P. Shah, and L. Heck, 2017. End-to-End Optimization of Task-Oriented Dialogue Model with Deep Reinforcement Learning. NIPS Conversational AI Workshop.

Martín-Fuertes, L. B., 2018. Google I/O: Multiple Actions or Double Intent?

Mortensen, D. R., P. Littell, A. Bharadwaj, K. Goyal, C. Dyer, and L. Levin, 2016. PanPhon: A Resource for Mapping IPA Segments to Articulatory Feature Vectors. COLING, pp. 3475-3484.

Ram, A., R. Prasad, C. Khatri, A. Venkatesh, R. Gabriel, Q. Liu, J. Nunn, B. Hedayatnia, M. Cheng, A. Nagar, E. King, K. Bland, A.Wartick, Y. Pan, H. Song, S. Jayadevan, G. Hwang, and A. Pettigrue, 2017. Conversational AI: The Science Behind the Alexa Prize.

Serban, I. V., C. Sankar, M. Germain, S. Zhang, Z. Lin, S. Subramanian, T. Kim, M. Pieper, S. Chandar, N. R. Ke, S. Rajeswar, A. De Brebisson, J. M. R. Sotelo, D. Suhubdy, V. Michalski, A. Nguyen, J. Pineau, and Y. Bengio 2017. A Deep Reinforcement Learning Chatbot. NIPS Conversational AI Workshop.

Stolcke, A. and J. Droppo, 2017. Comparing Human and Machine Errors in Conversational Speech Transcription.

Turing, A. M., 950. Computing Machinery and Intelligence. Technical report.

Williams, J. D., K. Asadi, and G. Zweig, 2017. Hybrid Code Networks: practical and efficient end-to-end dialog control with supervised and reinforcement learning. In 55th Annual Meeting of the Association for Computational Linguistics.

Woods, W. A., 1973. Progress in natural language understanding—An application to lunar geology. In National Computer Conference and Exposition.

Xu, P. and R. Sarikaya, 2013. Exploiting Shared Information for Multi-intent Natural Language Sentence Classification. Interspeech.

Young, S., G. Gašic, B. Thomson, and J. D. Williams, 2013. POMDP-based Statistical Spoken Dialogue Systems: a Review. Technical Report 5.

Zhelezniak, V., D. Busbridge, A. Shen, S. L. Smith, and N. Y. Hammerla, 2018. Decoding Decoders: Finding Optimal Representation Spaces for Unsupervised Similarity Tasks. ICLR.

Zhong, V., C. Xiong, and R. Socher, SEQ2SQL: Generating Structured Queries Fromnatural Language Using Reinforcement Learning. Technical report.

* cited by examiner

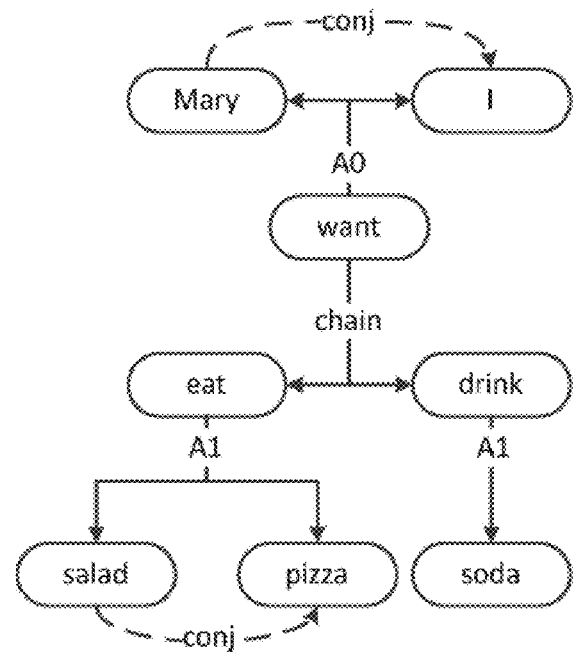
FIG. 6A
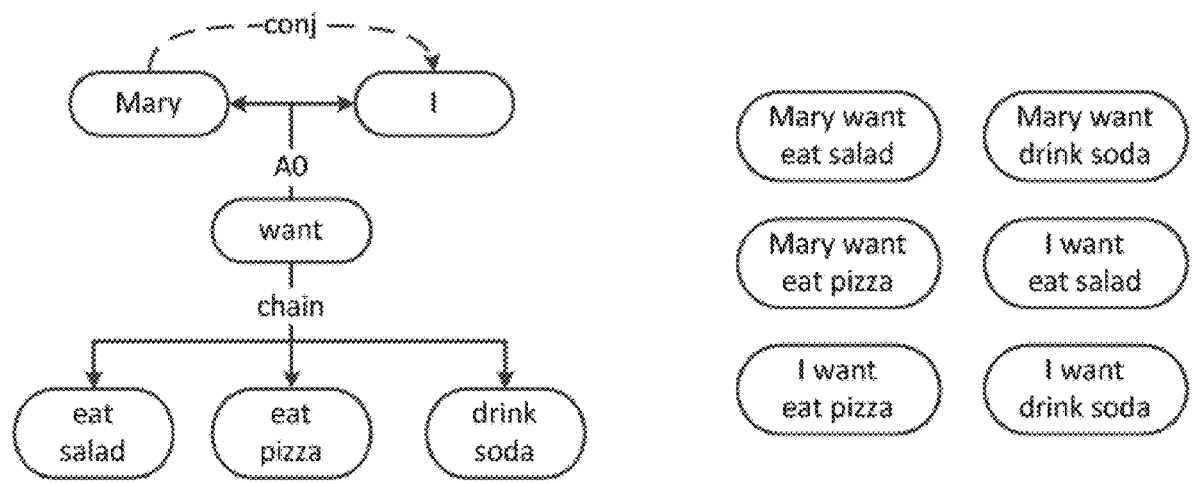
FIG. 6B
FIG. 6C

SEMANTIC GRAPH TRAVERSAL FOR RECOGNITION OF INFERRED CLAUSES WITHIN NATURAL LANGUAGE INPUTS

CROSS-REFERENCE TO RELATED APPLICATION

The present application claims the benefit of priority under 35 U.S.C. § 120 as a continuation of U.S. patent application Ser. No. 16/261,970, entitled "SEMANTIC GRAPH TRAVERSAL FOR RECOGNITION OF INFERRED CLAUSES WITHIN NATURAL LANGUAGE INPUTS," filed on Jan. 30, 2019, the disclosure of which is hereby incorporated by reference in its entirety for all purposes.

TECHNICAL FIELD

The present disclosure relates to improvements in computational efficiency and accuracy when extracting multiple intents from natural language inputs. In particular, but without limitation, the present disclosure relates to improvements in the parsing of semantic graphs for input phrases to determine multiple inferred clauses to provide more accurate determination of meaning for use in, for instance, dialogue systems and information extraction systems.

BACKGROUND

Traditionally, user inputs into computing systems have either been limited to a predefined set of selectable options or require the user to be proficient in a computing language in order for the input to be interpreted correctly. This is due to the relative inability for computing systems to understand natural language, that is, conventional language (such as English or Japanese), that has evolved through use between humans.

To solve this problem, natural language processing methods are being developed in order to allow users to interact with computers in a more natural and effective way. Natural language processing relates to the methods by which computers process and analyse natural language data. This is useful in dialogue systems and information extraction systems. Dialogue systems (or conversational agents) are computer systems that make use of natural language processing to converse with humans in a coherent manner. Information extraction systems make use of natural language processing to automatically extract structured information from unstructured or semi-structured machine-readable text.

One method used in natural language processing is semantic parsing. This extracts the semantic meaning of various words within a sentence. One example of this is shallow semantic parsing. Put simply, shallow parsing refers to the extraction of the 'who,' 'when,' 'what,' 'where,' 'why,' and 'how' elements of an action.

SUMMARY

Embodiments described herein provide a more flexible, effective, and computationally efficient means for determining multiple intents within a natural language input. Some methods rely on specifically trained machine learning classifiers to determine multiple intents within a natural language input. These classifiers typically require a large amount of labelled training data in order to work effectively, and are generally only applicable to determining specific types of intents (e.g., a specifically selected set of potential inputs). In contrast, the embodiments described herein avoid the use of specifically trained classifiers by determining inferred clauses from a semantic graph of the input. This allows the methods described herein to function more efficiently and over a wider variety of potential inputs.

According to a first aspect, a computer-implemented natural language processing method is provided comprising obtaining a semantic graph representing semantic meaning of an initial set of words. The semantic graph comprises: a plurality of nodes, each node representing a span of one or more words taken from the initial set of words and having a corresponding shared semantic role within the initial set of words; and one or more edges, each edge connecting semantically linked nodes and each edge being labelled with a corresponding semantic relationship, wherein the semantic graph forms a tree having one or more root nodes and one or more leaf nodes. The method further comprises for each root node within the semantic graph, forming a set of one or more inferred clauses for the root node by: determining every possible combination of the root node and its descendants, wherein each combination is selected such that the nodes within the combination form a contiguous series of connected nodes within the semantic graph and wherein every possible descendent of the root node from the semantic graph is selected with the exception that, for each parent node that is a descendent of the root node, only one child node is selected for each type of semantic relationship that the parent node has with its one or more child nodes; and forming the set of one or more inferred clauses for the root node by combining the spans for each determined combination. The method further comprises setting the one or more inferred clauses for the one or more root nodes to be a set of one or more inferred clauses for the initial set of words, determining a response to the initial set of words based on at least one of the one or more inferred clauses for the initial set of words, and outputting the determined response.

By selecting only one child node per semantic relationship with the parent, separate inferred clauses are formed for every repetition of a semantic relationship with the parent node. This ensures that independent concepts are kept separate, whilst ensuring the linked concepts are contained within the inferred clauses. Each inferred clause can be considered the simplest syntactically complete sentence such that, if the inferred clauses are enumerated and connect with appropriate conjunctions, the meaning of the original sentence is recovered.

Multiple child nodes having the same semantic relationship to the parent tend to occur for conjunctions. Accordingly, the semantic graph may be formed such that each conjunction between nouns or argument modifiers within the initial set of words is represented by separate nodes corresponding to each noun or argument modifier within the conjunction. Furthermore, an inferred clause for a root node may be formed for each potential combination of descendants of the root node such that each combination forms a contiguous series of connected nodes within the semantic graph and every possible descendent of the root node from the semantic graph is selected with the exception that only one node is selected from each set of nodes (e.g., noun nodes or argument modifier nodes) forming part of a conjunction.

In one embodiment, the method includes receiving input data, wherein the input data comprises the initial set of words. Obtaining the semantic graph may then comprise determining the semantic graph from the input data. Alternatively to the above, the semantic graph may be received from an external source (e.g., an external computing system that has determined the semantic graph from input data). The semantic graph may be a directed acyclic graph.

According to an embodiment, forming a set of one or more inferred clauses for the root node includes: for each leaf node that is a descendent of the respective root node, setting an inferred clause for that leaf node to include the span for that leaf node; and, for each parent node within the semantic graph, starting from the one or more parent nodes of the respective leaf nodes and moving up the semantic graph to the respective root node, determining a set of one or more inferred clauses for the respective parent node. The set of one or more inferred clauses for the respective parent are determined by: determining each possible combination of the respective parent node and the one or more child nodes of the respective parent node, where only one child node is selected for each semantic relationship relative to the respective parent node; and for each combination of the respective parent node and the one or more child nodes of the respective parent node, combining the spans for the combination to form an inferred clause for the respective parent node.

According to a further embodiment, each possible combination of the respective parent node and the one or more child nodes of the respective parent node comprises grouping the respective parent node and the one or more child nodes according to their semantic role and determining the Cartesian product across the groups.

The grouping of parent and child nodes may be based on semantic roles relative to each other (each of combination of parent and child). The Cartesian product can be considered an operation that, when given a number n of sets, returns the set of all n-tuples.

According to an embodiment, combining the spans for each determined combination comprises, for each determined combination, forming a span that includes each of the spans for each node within the combination.

The spans for each determined combination may be combined to reproduce the syntactic dependency of the equivalent spans within the initial set of words. This may be based on a syntactic dependency tree of the initial set of words. Having said this, whilst this method would form syntactically correct inferred clauses, alternative methods exist where the combinations do not reproduce exactly the initial dependencies. Instead, the combinations may be formed through the use of a language model that is designed to ensure that the inferred clauses are syntactically correct.

According to an embodiment, determining a response to the initial set of words comprises: for each inferred clause for the initial set of words, determining an input corresponding to the inferred clause; and determining the response based on the determined inputs.

According to an embodiment, determining an input corresponding to the inferred clause comprises for each of a set of predefined inputs, determining a semantic similarity between the inferred clause and the predefined input and selecting a corresponding predefined input based on the determined semantic similarities for the inferred clause.

In other words, each inferred clause may be compared to a set of predefined inputs (e.g., for a current dialogue state of the system). Where the method is performed by a dialogue system, these predefined inputs may be expected answers to a question previously asked by the dialogue system. In one embodiment, the predefined input that has the highest similarity to the inferred clause is selected as a match to the inferred clause. Alternatively, the method might select each predefined input that has a similarity relative to the inferred clause that exceeds a threshold. Where multiple predefined inputs are selected for a single inferred clause, the method may implement disambiguation to determine which of these predefined inputs to select as the match. This may involve applying a further similarity measure that is different to the previous similarity measure (e.g., one with higher precision and lower recall) and selecting the predefined input that has a highest similarity under this further similarity measure.

According to a further embodiment, determining an input corresponding to the inferred clause comprises applying a classifier to the inferred clause and selecting the input based on an output of the classifier. By extracting inferred clauses prior to inputting them into a classifier, classification accuracy is improved as the classifier works on smaller, less complicated inputs. Furthermore, the complexity of the classifier can be reduced whilst still maintaining accuracy. This ensures that fewer training examples are required to train the classifier, leading to a more computationally efficient system.

The semantic graph includes one or more semantic relationships wherein the subject of the relationship is not constrained to be a verb node and one or more semantic relationships wherein the object of the relationship may be a verb node.

According to one embodiment: determining a response to the initial set of words comprises, for each inferred clause, determining a semantic triple including a subject, a relation, and an object taken from the inferred clause; and outputting the determined response comprises transmitting the semantic triple for inclusion as a data pattern in a knowledge base. By breaking the input down into inferred clauses, the extraction of inferred clauses can be improved. For instance, entity detection can be achieved more efficiently and effectively for smaller inferred clauses than over the entirety of the input.

According to a further embodiment, the semantic graph represents one or more semantic relationships including one or more of: a conjunction between two noun nodes or two argument modifier nodes; a combination of an auxiliary verb and a corresponding main verb or a corresponding further auxiliary verb; an argument modifier node being an argument modifier for a noun node; and a chain of verb nodes. This provides a more complex representation of semantic meaning within the input, thereby allowing the inferred clauses to be extracted effectively.

According to a further embodiment, the one or more semantic relationships include a conjunction between two noun nodes or two argument modifier nodes and any edges representing conjunctions within the semantic graph are ignored when forming the set of one or more inferred clauses for the each root node. In one embodiment, the semantic graph splits conjunctions between arguments, representing each argument within the conjunction as a separate node connected to the parent node of the conjunction. The conjunction itself (between the two arguments) may or may not be represented. Where the conjunction is represented in the graph (e.g., by a corresponding edge between the nodes), then the method may ignore these conjunction edges when determining the inferred clauses. This ensures that conjunctions are effectively separated between inferred clauses.

According to an aspect, there is provided a non-transitory computer-readable medium including instructions that, when executed by a processor, cause the processor to perform any of the methods described herein.

According to a further aspect, there is provided a system including a processor and a memory, the memory including instructions that, when executed by the processor, cause the processor to perform any of the methods described herein.

According to a further embodiment, a computer-implemented natural language processing method includes obtaining a semantic graph representing semantic meaning of an initial set of words. The method further includes determining, from the semantic graph, an inferred clause. Determining the inferred clause includes selecting a root node from the semantic graph. Determining the inferred clause further includes selecting a combination of nodes including the root node and a set of descendants of the root node such that the nodes within the combination form a contiguous series of connected nodes within the semantic graph and wherein, for each parent node that is a descendent of the root node, only one child node is selected for each type of semantic relationship that the parent node has with its one or more child nodes. Determining the inferred clause further includes forming the inferred clause from the selected nodes.

BRIEF DESCRIPTION OF THE DRAWINGS

Arrangements of the present invention will be understood and appreciated more fully from the following detailed description, made by way of example only and taken in conjunction with drawings in which:

FIG. 6A shows a semantic graph for the sentence "Mary and I want to eat salad and drink soda";

FIG. 6B shows an intermediate form of the semantic graph of FIG. 6A during the determination of inferred clauses;

FIG. 6C shows a set of inferred clauses determined from the semantic graph of FIG. 6A.

DETAILED DESCRIPTION

Figure 1:
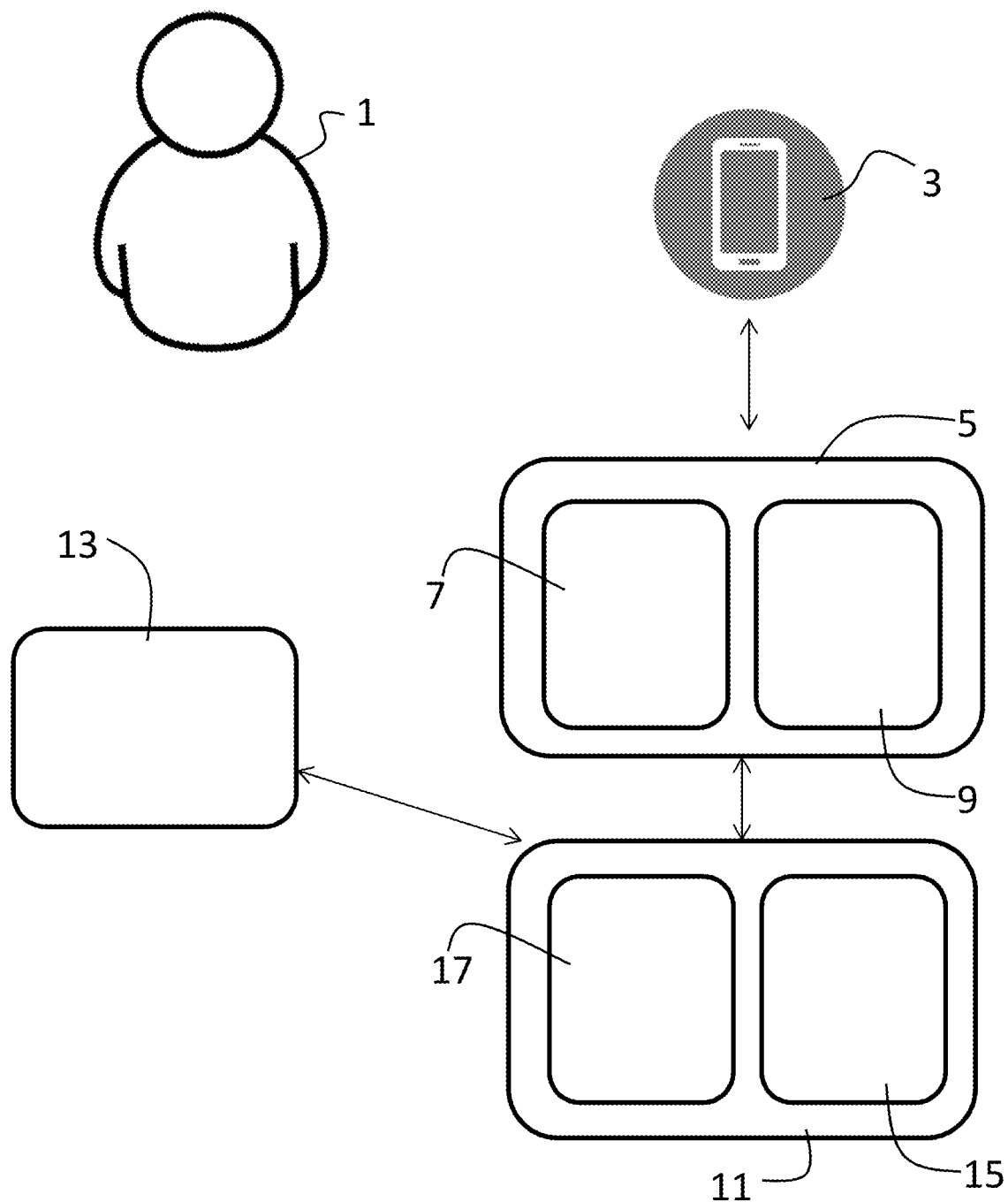
FIG. 1 shows a schematic of a dialogue system, according to an embodiment.

The embodiments described herein provide improved methods for multiple intent recognition. Specifically, the methods described herein provide improved means for parsing a semantic graph in order to extract multiple input clauses.

Some methods for recognising multiple intents within natural language inputs treat the problem as a multi-label classification problem, in which each sentence is labelled with its potentially multiple intents, or a sequence-labelling problem in which each word is assigned to an intent. The downside of these classification approaches is that they are supervised learning techniques that require annotated conversational training data. It can be difficult to obtain sufficiently large sets of labelled data to enable such supervised learning systems to be trained. In addition, such systems generally need to be trained for their specific type of dialogue. These classifiers are therefore limited in that they are computationally expensive, requiring a large amount of labelled training data, and result in systems that can operate over only a narrow range of inputs.

The disclosed system provides an improvement to computer functionality by allowing for reduced memory capacity requirements and more flexible multiple intent recognition. The methods described herein rely on unsupervised representation learning and well-established, "off-the-shelf" models that encode linguistic prior knowledge. This avoids the need for obtaining and processing large amounts of labelled training data. Furthermore, the methods described herein are applicable to any intent, as they do not require specifically trained models. Furthermore, as the present methods do not require complex supervised learning models to classify a large number of intents, the methods described herein are more computationally efficient by allowing for reduced memory capacity requirements. Instead, all that needs to be stored is the rules for parsing the semantic graph to extract the multiple inferred clauses, as described herein.

Furthermore, the disclosed system addresses the technical problem of the relative inability for computing systems to understand natural language, with a technical solution that avoids the use of specifically trained classifiers by determining inferred clauses from a semantic graph of the input. The technical solution disclosed herein permits for methods described herein to function more efficiently and over a wider variety of potential inputs.

It is important for human-to-machine interfaces, such as dialogue systems, to accurately parse and understand the meaning of input text, as this allows the interfaces to correctly determine meaning and intent and respond appropriately.

Having said this, natural language processing is not limited to application within dialogue systems, and instead has application in a wide variety of computing fields in which it is important to determine the meaning of textual or spoken content (e.g., information extraction or information retrieval). For instance, a set of medical textbooks may be analysed to extract known relationships between medical conditions and medical symptoms (information extraction). Alternatively, a user may input "Please display my medical records" and the system may make use of natural language processing in order to determine the meaning of the user's request and determine the appropriate response to the request, to retrieve and display their medical records (information retrieval).

Dialogue System

FIG. 1 shows a schematic of a dialogue system, according to an embodiment. In one embodiment, a user 1 communicates with the system via a mobile phone 3. However, any device could be used that is capable of communicating information over a computer network, for example, a laptop, tablet computer, information point, fixed computer, voice assistant, etc.

The mobile phone 3 communicates with interface 5. Interface 5 has two primary functions; the first function 7 is to take the words input by the user and turn them into a form that can be understood by the inference engine 11. These words may be text that is input (e.g., typed) into the mobile phone. Alternatively, these words may be spoken (uttered) by the user and recorded by the phone, for instance, via a microphone. The second function 9 is to take the output of the inference engine 11 and to send this back to the user's mobile phone 3.

In the present embodiments, Natural Language Processing (NLP) is used in the interface 5. NLP is one of the tools used to interpret, understand, and then use every day human language and language patterns. It breaks speech or text down into shorter components and interprets these more manageable blocks to understand what each individual component means and how it contributes to the overall meaning.

The interface 5 utilises a conversation handling module for managing dialogue flows with a user. This is a dialogue system that generates queries for the user, determines the semantic meaning behind the user's inputs, and determines follow-up responses. This may be by extracting sub-phrases or sub-clauses from the user's inputs and matching these with expected user inputs to determine predefined follow-up responses. The conversation handling model may be provided with simple logic which allows the device to, for example, direct the user 1 to a human operator, if required.

In a specific embodiment, the dialogue system is a diagnostic system that determines one or more potential medical conditions based on the user's inputs. Through NLP, it is possible to transcribe consultations, summarise clinical records, and converse with users in a more natural, human way.

Naturally, it is important that the user's inputs are recognised effectively. The present embodiments are primarily concerned with improving input recognition accuracy and computational efficiency. However, simply understanding how users express their symptoms and risk factors is not enough to identify and provide reasons about the underlying set of diseases. For this, the diagnostic engine 11 is used. The diagnostic engine 11 is a powerful set of machine learning systems, capable of reasoning on a space of over hundreds of billions of combinations of symptoms, diseases and risk factors, per second, to suggest possible underlying conditions. The diagnostic engine 11 can provide reasoning efficiently, at scale, to bring healthcare to millions.

The diagnostic engine comprises an inference engine 15 and a probabilistic graphical model 17. The probabilistic graphical model 17 stores various potential symptoms, medical conditions, and risk factors. The inference engine 15 is a module that applies logical rules to the knowledge base and probabilistic graphical model to deduce new information (infer information from the input information, the knowledge base 13 and the probabilistic graphical model 17). The inference engine 15 aims to answer a specific overall question (in this case, "what is the diagnosis?"). The inference engine 15 generates questions for the user to answer in order to obtain information to answer the overall question. Each question is selected in order to reduce the overall uncertainty within the system.

In the present case, the inference engine 15 utilises the probabilistic graphical model 17 to determine a diagnosis. The inference engine 15 selects a question by choosing the question that would most increase the value of information (i.e., that would most decrease uncertainty in the diagnosis). The user's answer is then passed back to the inference engine 15, which uses this new information to generate a further question.

In an embodiment, the knowledge base 13 is a large structured set of data defining a medical knowledge base. A knowledge base is a set of facts and rules which the system has access to for determining a potential medical condition. The knowledge base 13 describes an ontology, which in this case relates to the medical field. It captures human knowledge on modern medicine encoded for machines. This is used to allow the above components to speak to each other. The knowledge base 13 keeps track of the meaning behind medical terminology across different medical systems and different languages. In particular, the knowledge base 13 includes data patterns describing a plurality of semantic triples, each including a medical related subject, a medical related object, and a relation linking the subject and the object.

An example use of the knowledge base 13 would be in automatic diagnostics, where the user 1, via mobile device 3, inputs symptoms they are currently experiencing, and the interface engine 11 identifies possible causes of the symptoms using the semantic triples from the knowledge base 13.

As the knowledge base 13 matches semantic triples in the knowledge base to semantic triples extracted from a conversation with a user, it is important that these semantic triples are extracted from the user's input text effectively. If inaccurate information is extracted from the input text then the system will be less effective at processing the input and generating a response (e.g., less accurate at matching the input to semantic triples in the knowledge base, or less accurate at processing the input dialogue and determining an appropriate dialogue response). This means that the response will be less accurate. In addition, the system will be less computationally efficient, as it will require additional clarifying inputs (or additional post-processing steps on the inputs) in order to extract the necessary information.

In addition to the extraction of information from user inputs for a dialogue system or diagnostic system, the methods described herein can also be utilised to build the knowledge base 13. The knowledge base 13 can be built by extracting information from large amounts of unstructured text. For instance, a medical knowledge base can be built by extracting semantic triples (e.g., corresponding medical conditions and medical symptoms) from medical text. The automatically extracted semantic triples can be validated by experts in order to ensure that they are accurate. As the knowledge base 13 can be built through the extraction of semantic triples from data, the improved methods of intent recognition described herein can be used to make this process more accurate and more computationally efficient.

Semantic Role Labelling

Semantic role labelling (SRL) is a form of semantic parsing. SRL is a process in which individual words or phrases within an overall phrase or sentence are parsed and labelled in accordance with their respective semantic roles within the overall phrase or sentence. That is, SRL is the process of assigning spans of text in a sentence (or phrase) to specific roles.

Semantic graphs are a type of graph representing the semantic relationships between concepts. In SRL, the concepts are the syntactic components of a sentence, with the edges defining the semantic relationships between these components. These semantic representations are useful intermediate steps in Natural Language Processing (NLP), because they abstract from the direct syntax.

The predominant use for semantic graphs is to represent data, giving structure to the information (often in a hierarchical fashion). Using this structure of relationships allows inferences to be made on the data; for example, given two triples such that the subject, predicate, and object portions of the triples are as follows:

Cersei, daughter of, Tywin;
Joffrey, son of, Cersei;

an inference can be made that Joffrey is the grandson of Tywin. This can be very powerful, and means that a large amount of both explicit and implicit information can be stored by semantic graphs.

However, there are shortcomings with respect to the richness of the semantic graphs used in SRL. In this application, we address some of these shortcomings, describing an augmentation of SRL graphs in order to enrich the representations.

Each graph can be made up of triples representing subject-predicate-object expressions. The meanings of subject, predicate, and object are:

Subject—the person, place, thing, or idea that is performing an action or having a state
Predicate—the action or state of being of the subject (e.g., a verb)
Object—the noun or concept that is part of the action of the subject (e.g., that is acted upon)

Specifically, SRL identifies the predicate (e.g., the verb) within a phrase and the arguments of the predicate (e.g., the subject and object). Each identified entity is labelled according to its semantic role. Accordingly, specific roles are assigned to individual words or groups of words. These roles can be very generic, as described in Table 1. These roles are defined in the Proposition Bank project, which adds a layer of predicate-argument information to syntactic structures.

A predicate is a verb and any auxiliaries that accompany the verb. An argument is an expression that helps to complete the meaning of the predicate (e.g., the participants in the event of the verb). A predicate and its argument form a predicate-argument structure. In the above example of "Cersei, daughter of, Tywin," the associated predicate would be "daughter," the subject would be "Cersei" and the object would be "Tywin." The associated predicate-argument structure would be daughter (Cersei, Tywin).

TABLE 1

Proposition Bank Roles

| Role | Role Definition |
| --- | --- |
| ARG0 | PROTO-AGENT |
| ARG1 | PROTO-PATIENT |
| ARG2 | benefactive, instrument, attribute or end state |
| ARG3 | start point, benefactive, instrument or attribute |
| ARG4 | end point |
| ARGM-TMP | Temporal Concept |

As shown in Table 1, the syntactic relationship between a predicate (e.g., a verb) and another word (e.g., a noun) is represented by an assigned role which specifies how the word relates to the predicate. For instance, in the phrase "The cat eats the mouse," the predicate (verb) "eats" is semantically related to the nouns "cat" and "mouse." The "cat" is the agent (ARG0) in this statement, whilst the "mouse" is the object, or patient (ARG1), of the statement.

In addition to general roles, it is also possible to support a database of specific roles for each verb in English. Table 2 shows an example.

TABLE 2

SRL with Propbank

| Constituents | The cat | eats | the mouse |
| --- | --- | --- | --- |
| Roles | ARG0 | V | ARG1 |
| Specific Roles | consumer, eater | | meal |

In the example of Table 2, the phrase "The cat eats the mouse" is broken down into its constituent parts. "The cat" is the agent, "eats" is the verb, and "the mouse" is the object, or patient. Having said this, specific roles are also assigned for the specific verb "eats." In this case, the agent is a "consumer" or "eater," and the mouse is a "meal." Similar specific roles can be assigned to other verbs in English.

Another way to represent semantics in the context of NLP is FOL, or First Order Logic. FOL represents relations between the constituents of a sentence by assigning predicates between the arguments and with the help of quantifiers, such as $\exists$ and $\forall$. Take the example of before; in FOL it would be represented as:

$$\exists e{:}ISA(e,\text{Eating}) \wedge \text{Eater}(e,\text{cat}) \wedge \text{Meal}(e,\text{mouse})$$

This representation is sound but is complicated to reason due to the unconstrained relationship types. This results in practically an infinite set of relationship types, while SRL limits that set to something more tractable.

Having said this, current methods often fail when it comes to analysing larger stretches of text or linked concepts.

Fine-grained intent recognition, especially in a specialized domain, requires an advanced level of language understanding. User interactions are often complex and could contain a mix of statements and questions, which could be difficult to identify correctly. However, there are ways to simplify the problem setting. For example, limiting the domain of the conversation and using a knowledge base as an anchor point for the processing simplifies the problem considerably.

One of the established approaches to the problem in this case would set up a series of processing steps, including Named Entity Recognition (NER) and Named Entity Linking for the entity side, and dependency parsing and SRL for the relations side.

Shallow semantic parsing aims at generating a representation that is faithful to the language surface form, such as λ-calculus, while accurately representing its meaning in some logical form. Semantic frames, sets of relations built around a particular sense of a verb, influence a number of formalisms such as SRL. This formalism seeks to answer the following questions about each verb frame in a sentence—who, when, what, where, why, and how—thereby generating a set of relational triples that forms a semantic graph.

Semantic role labelling is generally implemented using a machine learning model (for instance, a Long Short-Term Memory (LSTM) model) that generates a sequence of tags for each word in a sentence. In this case, the tags signify the relation of each word to the verb of a given frame. Once the semantic roles have been assigned, the machine learning model can build a semantic graph representing the determined semantic relationships.

Each semantic graph is made up of a number of nodes each representing a contiguous span of one or more words taken from the input text, the span of words having the same semantic classification. Each node has a particular type (e.g., verb, noun, argument modifier). The relationship between nodes (and therefore the relationship between these different semantic groups) is reflected by an edge that joins the related nodes. The type of relationship (i.e., how one node is semantically related to another node, such as being an object to a predicate) is reflected by a label that is assigned to the edge.

The verb, as a centre of the frame, is always the subject of a triple, which makes the resulting graph a shallow tree. Therefore, there can be one or more graphs per sentence based on the number of verbs. As each shallow tree (each frame) is independent, information about the interaction between these frames may be lost, and additional post-processing methods may be required to stitch together these frames to form an accurate semantic graph representing the meaning of the entirety of the input phrase or sentence.

In addition, SRL generally does not deal with conjunction reduction, i.e., the frames are meant to include arguments containing conjunctions. The arguments of the frames can contain multiple independent entities, joined by a conjunction. This makes it difficult to match up with input with the corresponding data within the knowledge bank relating to the independent entities. Additional post-processing methods may be required in order to separate out arguments containing conjunctions.

The present application examines some of the limitations of the SRL formalism itself, as well as some of its implementations in the context of information extraction and intent recognition. Information extraction is often carried out as a combination of recognizing entities in text (Named Entity Recognition) and then recognizing relations between them (relation extraction).

Improved Semantic Graph Formalism

The embodiments described herein overcome a number of the limitations associated with SRL when it comes to parsing longer, more complicated phrases. They form a more accurate semantic graph for larger phrases and sentences during the initial formation of the semantic graph and therefore avoid the need for post-processing steps to create these graphs.

FIGS. 2A-F show a number of examples of SRL graphs. This highlights some shortcomings in the SRL formalism.

First, it is noted that traditional verb frames ignore the relations between verbs. While there are frames for each verb and verbs may be contained in the arguments for other verbs, there is no clear relation expressed through the graph.

Figure 2A:
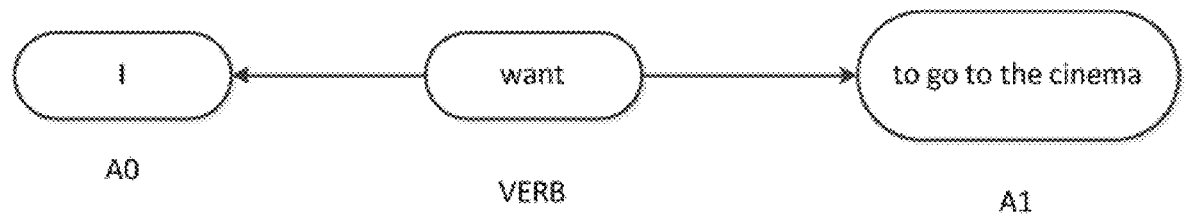
FIGS. 2A-F show a number of examples of Semantic Role Labelling (SRL) graphs.
Figure 2B:
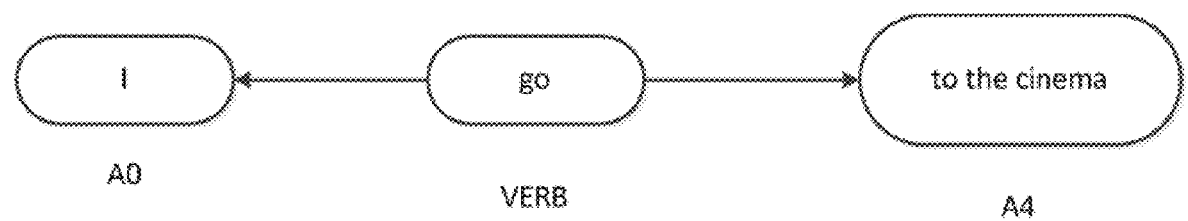

This is particularly obvious in sentences with verbs such as "want," as illustrated in FIGS. 2A and 2B.

FIGS. 2A and 2B show respective SRL graphs for the phrase "I want to go to the cinema." In FIG. 2A, the verb is "want," the subject is "I" and the object is "to go to the cinema." In FIG. 2B, the verb is "go," the subject is "I," and the object is "to the cinema."

Due to the inability for traditional SRL to capture links between verbs, the graph of FIG. 2B is inaccurate, as the subject hasn't gone to the cinema, but wants to go to the cinema. Equally, the object of FIG. 2A is too specific and hides additional information within the object.

The desire for going to the cinema is only captured through further analysis of the object (ARG1) in FIG. 2A and by the linking of the two frames in FIGS. 2A and 2B into a larger, more complex structure. In the embodiments described herein, this is achieved through the inclusion of a chain verb role (in this case, "go" would be the chain verb).

Figure 2C:
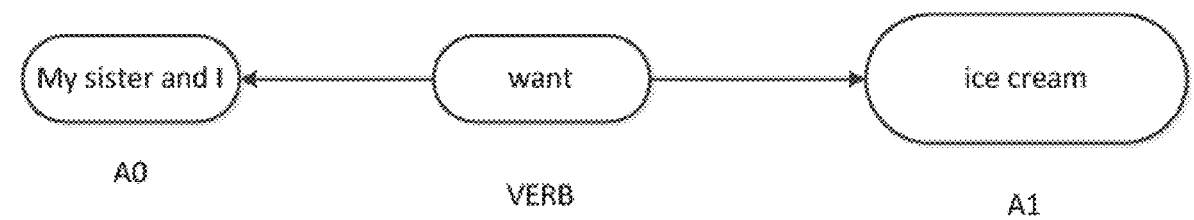
Figure 2D:
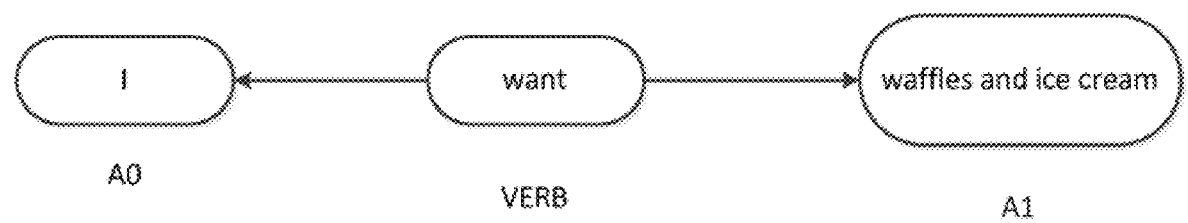

FIGS. 2C and 2D show how conjunction within an object (ARG1) or subject (ARG0) can lead to a lack of granularity in the extracted relations.

FIG. 2C shows an SRL graph for the term "My sister and I want ice cream." In this case, the term "My sister and I" is labelled as the subject. This could lead to the subject "My sister and I" being considered a separate entity to the individual entities "My sister" and "I." This can lead to issues associating the information conveyed by the phrase with the individual entities (e.g., those contained within a knowledge base).

FIG. 2D shows a similar situation where the term "I want waffles and ice cream" results in the phrase "waffles and ice cream" being considered a single, combined object (ARG1), instead of the separate entities "waffles" and "ice cream."

Additional breaking of conjunctions is needed to produce accurate fine-grain representation. This is necessary when aiming at generating links between entities in a knowledge base and not just spans of text. To overcome this issue, embodiments introduce a conjunction role that links either pairs of noun nodes or pairs of argument modifier nodes (in this case, the term "and" would be a conjunction that links the two, separate entities).

As with other relationships within the semantic graph, the conjunction relationship is directed. In this case, the direction is determined by the order of the arguments within the original input sentence. Accordingly, the first argument within the conjunction is deemed to be the subject and the second argument within the conjunction is deemed to be the object. For instance, the conjunction "waffles and ice cream" results in a conjunction relationship with "waffles" as the object and "ice cream" as the subject. This therefore forms a directed conjunction edge from the "waffles" node to the "ice cream" node.

Figure 2E:
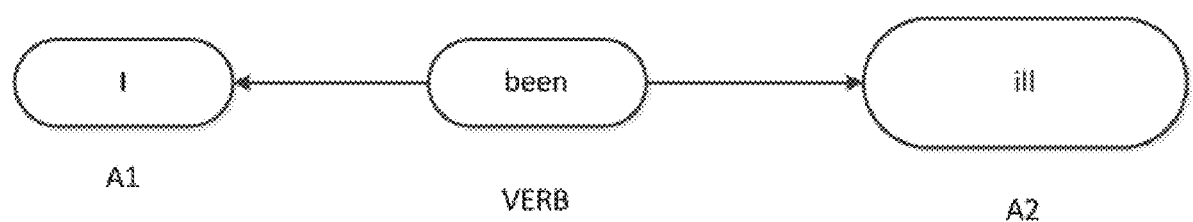

Finally, SRL is unable to extract information relating to auxiliary verbs. This is shown in FIG. 2E. The phrases "I had been ill" or "I have been ill" would both produce an SRL graph with "been" as the verb, "I" as the subject, and "ill" as the object/state (ARG2). This leads to lost information relating to the tense.

To overcome this issue, embodiments introduce an auxiliary verb role that can be linked to the verb. This allows the effective extraction of information related to auxiliary verbs.

Building complex concepts out of the linked entities poses another issue with using classic SRL graphs. Often the relational structure of knowledge bases does not necessarily reflect that of language. For example, a certain entity may have a time of occurrence modifier value which makes perfect sense but language expresses such relations through a verb and therefore logically the modifier is attached to the verb. This makes the extraction of certain relations somewhat more cumbersome.

Figure 2F:
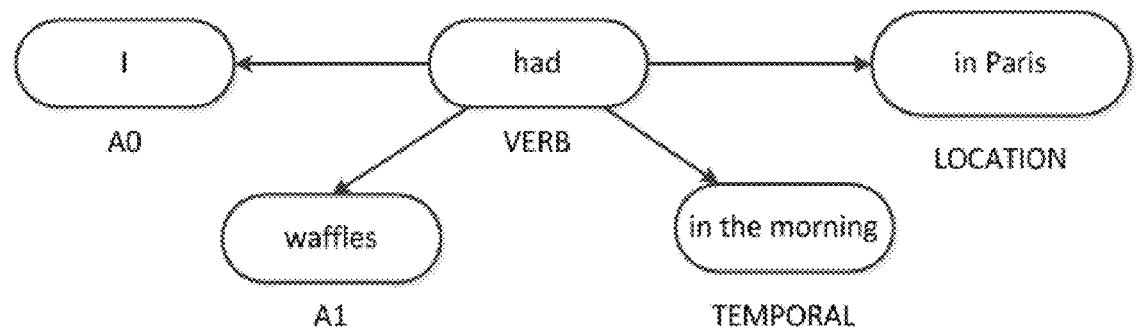

This issue is shown in FIG. 2F. In this case, the term "I had waffles in the morning in Paris" produces a graph with "had" as the central verb that is linked to four nodes, "I" (the subject), "waffles" (the object), "in the morning" (a time modifier), and "in Paris" (a location modifier). As the time and location modifiers are each independently associated with the verb "had," there is no recognition of the relationship between the time and place. This can mean that this relationship is not extracted from the text, thereby leading to inaccurate understanding.

To resolve the above issue, argument modifier roles are expanded so that they can link to noun nodes. This means that the argument modifier nodes "in the morning" and "in Paris" can be linked to the noun node "waffles" to ensure that their correct relationship is extracted. In contrast, previous SRL methods only link argument modifier nodes with the central verb.

The shortcomings described above pose the need for a new deeper semantic graph formalism that is grounded both in language and in a knowledge base, i.e., some of its edges need to represent concept relations as expressed in the knowledge base.

Traditional SRL models build semantic graphs primarily around a single central verb. In this regard, only relationships between the central verb and its arguments are considered. Even argument modifiers are associated only with the central verb. In other words, only links between verbs and nouns are recorded. Accordingly, information is lost with regard to the arguments of the verb and any links between these arguments, and it is not possible to break down more complicated phrases into appropriately granular structures.

The embodiments described herein expand the traditional SRL formalism such that, unlike SRL, the relationships are not constrained to have a verb as the subject and a non-verb (e.g., noun or argument modifier) as the object. This allows relationships to be recorded between pairs of nouns, pairs of argument modifiers, and pairs of verbs. This means that it is possible to link auxiliary verbs to their associated main verbs, to link chains of verbs, and to divide conjunctions as the links between pairs of nouns or pairs of argument modifiers. Furthermore, by allowing additional associations with the arguments of the verb (i.e., by avoiding the verb central formalism of previous methods), it is possible to associate argument modifiers with the argument itself (the noun), rather than (or in addition to) the verb.

Specific embodiments described herein implement two main changes relative to traditional SRL models of semantic graph representation. Firstly, the vocabulary of predicates is supplemented with a number of additions that serve to enrich the semantic graph. In Table 3, these can be seen in the Predicate column as AUX, chain, and conj.

Auxiliary verbs are labelled as such and attached to the verb to which they apply, based on the linguistic dependencies between verbs in an input. This mitigates explosions of verbs, and more completely represents the semantics of the input sentence. An auxiliary verb may be attached to a main verb, or to another auxiliary verb.

Chain edges connect verbs which are syntactically linked. For example, the sentence "I want to go to the shops" contains a chain of verbs referring to the same argument, "the shops." Traditional SRL would apply each of these verbs to the argument, resulting in a graph that contains a possible reading of "I want the shops." With this new verb chaining, the graph contains a representation that removes this verbal ambiguity and provides a more accurate and more granular representation of the semantic meaning of the input phrase.

Conjunction edges indicate the conjunctive relationship between non-verb nodes in the graph. This provides a more granular graph, splitting arguments which contain conjunctions into multiple nodes, connected by a conjunction edge. This allows the syntactic structure of a sentence to be better represented in the graph. Conjunctions can be used to split a noun node into two noun nodes, or an argument modifier node into two argument modifier nodes.

The above improvements are provided by the redefining of the possible node types for subjects and objects. In traditional SRL, predicates have verb nodes as subjects and non-verb nodes as objects only. In the embodiments described herein, this has been extended such that each predicate has a different scope. These extensions can be defined as follows:

AUX predicates always have a verb node as both subject and object, as an auxiliary verb is always represented by a verb node, and is linguistically associated with another verb;

argument modifier predicates can now have either a verb node or a non-verb node as their subject (i.e., are not limited to having a verb node as the subject). This is to mitigate ambiguity, ensuring that the graph correctly indicates to which non-verb node a modifier applies;

chain predicates always have a verb node as both subject and object, as they represent the linguistic dependencies between verbs; and conjunction predicates always have a noun node as both subject and object, as they represent the conjunctive connections between noun phrases in an input text.

In the present formalism, the term "predicate" represents the semantic relationship between one word or group of words (the subject) and another word or group of words (the object). Accordingly, each predicate represents an edge within a semantic graph linking two nodes, each node representing a corresponding entity (a word or group of words taken from the original input text). Each node may be associated with a number of predicates. That is, each word or group of words may have a number of relationships, each relating to a different set of one or more words within the initial input text. For instance, in the phrase "I like apples and bananas," the node for "bananas" will be linked to the verb "like" due to it being one of the arguments of the verb (specifically, the object, ARG1). In addition, the node for "bananas" will be linked to the node for "apples" through a conjunction predicate (representing the term "and" within the initial phrase). An intervening node for "and" may be provided, but this may be left out, as it can be effectively represented by the conjunction edge on its own.

TABLE 3

Subject, predicate, and object triples descriptions for new semantic graph representation

| Subject | Predicate | Predicate Description | Object | Example |
|---|---|---|---|---|
| verb_node | AUX | Auxiliary verb | verb_node | I have been ill |
| verb_node | ARG0 | PROTO-AGENT | noun_node | I like cake |
| verb_node | ARG1 | PROTO-PATIENT | noun_node | I like cake |
| verb_node | ARG2 | benefactive, instrument, attribute or end state | noun_node | |
| verb_node | ARG3 | Start point, benefactive, instrument or attribute | noun_node | |

TABLE 3-continued

Subject, predicate, and object triples descriptions for new semantic graph representation

| Subject | Predicate | Predicate Description | Object | Example |
|---|---|---|---|---|
| verb_node | ARG4 | end point | noun_node | |
| noun_node or verb_node | ARGM-TMP | Temporal Concept | argm_node | I had pain this morning |
| noun_node or verb_node | ARGM-MNR | Manner | argm_node | I had pain really badly |
| noun_node or verb_node | ARGM-CAU | Cause | argm_node | I had a fever because of the cold |
| noun_node or verb_node | ARGM-LOC | Location | argm_node | I have numbness in my arms |
| noun_node or verb_node | ARGM-NEG | Negation | argm_node | I do not have cancer |
| noun_node or verb_node | ARGM-EXT | Extent | argm_node | I like it a lot |
| noun_node or verb_node | ARGM-PRP | Purpose | argm_node | I took drugs so I would feel better |
| noun_node or verb_node | ARGM-DIR | Direction | argm_node | I turned round to the left |
| noun_node or verb_node | ARG-PRD | Secondary Predication | argm_node | All humans are created equal |
| noun_node or verb_node | ARGM-REC | Reciprocal | argm_node | Four people each shaking hands with each other |
| noun_node or verb_node | ARGM-DIS | Discourse | argm_node | However, I should not have been ill |
| noun_node or verb_node | ARGM-ADV | Adverb | argm_node | I went to the toilet even though I didn't need to |
| noun_node or verb_node | ARGM-MOD | Modal | argm_node | I could have the flu |
| noun_node or verb_node | ARGM-DSP | Direct Speech | argm_node | Hello I have a fever |
| noun_node or verb_node | ARG-RLC | Relative Clause | argm_node | My mother, who is 86, is in hospital |
| verb_node | chain | Verb chain | verb_node | I try to go |
| noun_node or argm_node | Conj | Conjunction | noun_node or argm_node | I like apples and bananas / It hurts in my hand and my foot |

Figure 3A:
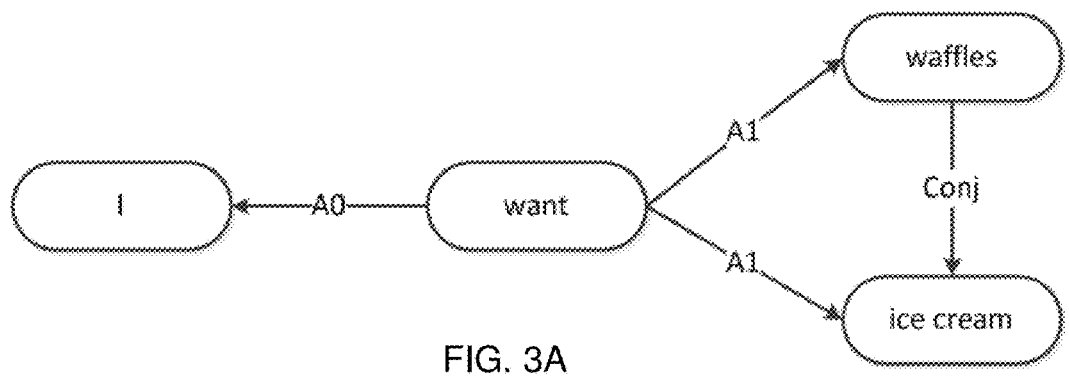
FIG. 3A shows a semantic graph determined, according to an embodiment, for the sentence "I want waffles and ice cream"

FIG. 3A shows a semantic graph determined, according to an embodiment for the sentence "I want waffles and ice cream." In this case, the system identifies the presence of a conjunction "and" and therefore splits the entities "waffles" and "ice cream," forming independent noun nodes within the graph for each entity. The new formalism allows the association between these two entities to be recorded via the conjunction edge that links the two noun nodes. In contrast, alternative methods would record the entity "waffles and ice cream" (see FIG. 2D), with additional post-processing steps being required to separate the two independent entities. In addition to two noun nodes being linked by a conjunction, two argument modifier nodes may also be linked (e.g., "my hand" and "my foot"). By identifying the correct entities when the graph is initially formed, the post-processing steps are avoided, thereby leading to a more computationally efficient method.

Figure 3B:
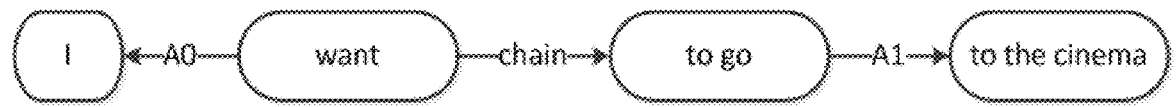
FIG. 3B shows a semantic graph determined, according to an embodiment, for the sentence "I want to go to the cinema"

FIG. 3B shows a semantic graph determined according to an embodiment for the sentence "I want to go to the cinema." In this case, the phrase "to go" is correctly identified as a chain verb that is related to the main verb "want." Accordingly, the predicate "want to go" is split into two nodes, the main verb node "want" and the chain verb node "to go" linked by a corresponding chain edge. This allows the correct granular meaning of the phrase to be determined initially from the semantic graph. In contrast, alternative methods would produce the two separate graphs (frames) shown in FIGS. 2A and 2B, and post-processing would then be required to link the two frames. The embodiments described herein avoid this additional post-processing and therefore provide a more accurate and computationally efficient mechanism for forming semantic graphs.

Figure 3C:
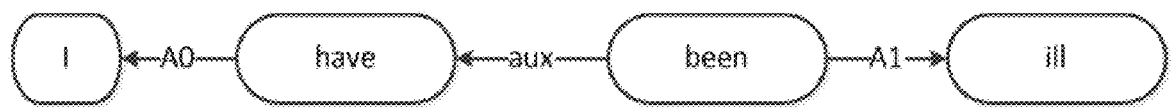
FIG. 3C shows a semantic graph determined, according to an embodiment, for the sentence "I have been ill"

FIG. 3C shows a semantic graph determined, according to an embodiment for the sentence "I have been ill." In this case, the verb "have" is correctly identified as the auxiliary verb of the main verb "been." Separate verb nodes are formed, joined by an auxiliary verb (aux) edge. This allows the correct tense to be extracted from the sentence. In contrast, alternative methods would omit the auxiliary verb, thereby ignoring the tense (see FIG. 2E).

It should be noted that two auxiliary verbs may be joined together via an aux edge. For instance, the sentence "The man will have been seen" contains three auxiliary verbs "will," "have," and "been" and one main verb "seen." This would therefore be represented by a chain of three auxiliary verbs connected to the main verb "seen."

Figure 3D:
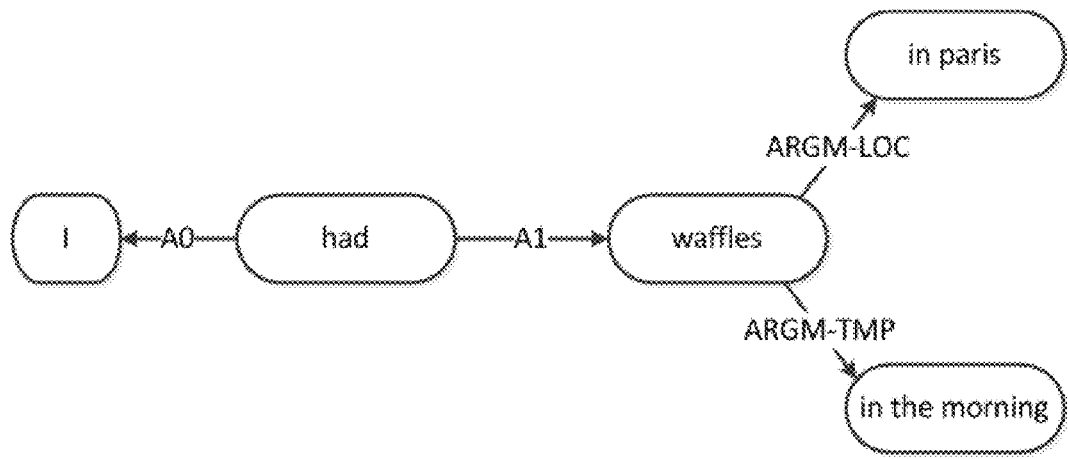
FIG. 3D shows a semantic graph determined, according to an embodiment, for the sentence "I had waffles in the morning in Paris"

FIG. 3D shows a semantic graph determined, according to an embodiment for the sentence "I had waffles in the morning in Paris." In this case, the argument modifiers "in Paris" (location) and "in the morning" (temporal) are not only linked to the verb "had" but are also linked to the object "waffles." By providing these additional edges between noun nodes (and not simply linking to the verb node), the relationship between the location, time, and object is correctly determined. In contrast, alternative methods would only determine the link to the verb (see FIG. 2F) and the interrelationship between the object and the argument modifiers would be harder to extract. Post-processing steps would be required to extract the links between these nodes, whereas they are correctly identified and linked initially during the formation of the semantic graph in the present embodiments.

The new semantic roles may be detected by training a machine learning classifier to identify these new roles, e.g., using supervised learning. Accordingly, one or more classifiers may be trained to identify auxiliary verbs, conjunctions, verb chains, and argument modifiers and to cluster the text accordingly and generate the graph according to the nodes and their interrelationship. Alternatively, the extension to the semantic rules may be implemented by adapting semantic tags generated by traditional SRL to extend the semantic graph (e.g., based on additional information provided by a syntactic dependency tree).

Natural Language Processing Method

As mentioned above, the semantic graph may be used in a variety of natural language processing methods. For instance, the semantic graph may be used by a dialogue system in order to determine a response within a dialogue with a user. Alternatively, the semantic graph may be used in an information extraction system to detect and store relationships between entities identified within unstructured text.

Figure 4:
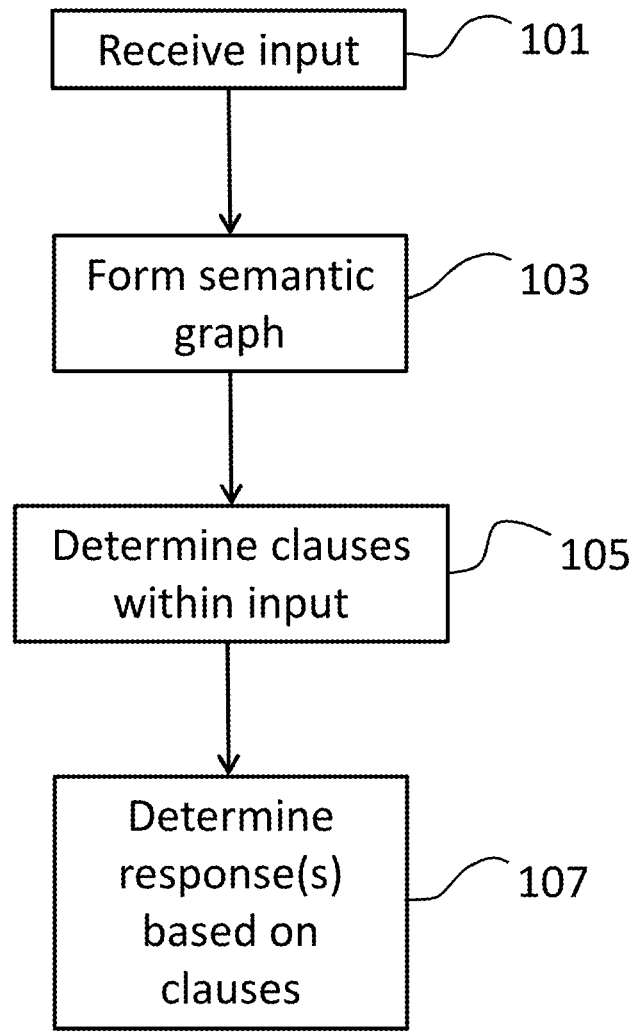
FIG. 4 shows a method for processing a natural language input from a user, according to an embodiment.

FIG. 4 shows a method for processing a natural language input from a user, according to an embodiment.

The method begins with the system receiving an input from the user 101. The input comprises a number of words. As described above, this may be an input from the user of a dialogue system, or may be an input from a medical text from which information is being extracted.

A semantic graph is then formed from the input 103. As discussed herein, the words in the input are classified and grouped together according to their semantic roles within the input. The relative semantic relationships between these groups are determined. That is, the words are parsed to determine the semantic relationship between the words in the input. A semantic graph is formed, with each node representing a group of one or more words having a particular semantic role, and edges representing semantic relationships between nodes. A node is assigned to each span of one or more consecutive words within the input that have the same semantic role. For instance, words may be grouped in terms of whether they form a verb conveying an action or an argument of the verb (e.g., relating to a noun). The types of nodes formed include noun nodes, verb nodes, and argument modifier nodes.

In a specific embodiment, the semantic graph is generated such that, unlike traditional SRL, the subject of each relationship is not constrained to be a verb node (it may be, for example, a noun node or an argument modifier node), and the object may be a verb. In addition, semantic roles for chains of verbs, conjugations, and auxiliary verbs are introduced, and argument modifier nodes are associated with the node to which they are most strongly related, regardless of whether this is a verb or a non-verb node.

It should be noted that certain nodes may occupy multiple semantic roles within the input text. For instance, a noun node may be both the object of a first verb and a subject of a second verb.

Specifically, the semantic graph used in some embodiments is formed via the following steps:

Semantic role labelling (SRL), which determines the semantic dependencies between the verbs in a sentence and their arguments. This is a relatively shallow semantic parse of the sentence. For the example sentence "It hurts at the back and on the right side," this would form a graph with the verb "hurts" at the root, and a single node for "at the back and on the right side."

Conjunction splitting on the arguments, which provides more granularity around the nouns and modifiers in the sentence. For our example, this would split the location modifier into the two nodes "at the back" and "on the right side."

Chaining of verbs in subordinate clauses, which allows the connection of separate SRL trees in multi-verb sentences. For instance, in "I think it hurts at the back," shallow SRL generates two disconnected trees, one for each verb in the sentence; in contrast, the present system aims to capture the semantics of the entire utterance and therefore a connection between these verb trees is required.

Once the semantic graph has been formed, the input text can be broken up into a number of phrases or clauses 105. This allows the system to extract separate pieces of information from a single input, without requiring specific classifiers to be trained.

To construct inferred clauses of a given utterance, one embodiment implements a recursive traversal algorithm over the semantic graph. Intuitively, the algorithm merges nodes starting from the leaves of the graph, ensuring that at most one successor with a given semantic relation to the current node is merged at a time. If there are multiple successors with the same semantic relation, then multiple such merged nodes are generated. This continues until the root node or root nodes of the sentence have been reached, at which point the spans assigned to the concatenated root nodes are the final inferred clauses.

This recursive method is described in more detail below with reference to Algorithms 2 and 3 and FIGS. 6A-6C.

Once a set of clauses has been determined, one or more responses are determined and output based on the clauses 107. The response may be the storage of information related to that clause (e.g., the identified symptoms or attributes), or may be a dialogue response that is associated with the clause. For instance, where a dialogue tree is being utilised, multiple clauses within a user's input may be utilised to select multiple options within the dialogue tree and progress the dialogue appropriately. Alternatively, if a slot-filling dialogue method is being used, each piece of identified information can be extracted and stored in order to determine the required pieces of information (the required slots that are to be filled).

One method of determining a dialogue response to a user input is to compare the input to a set of predefined inputs and selecting the most similar predefined input (and its corresponding predefined response). In order to more effectively determine the meaning behind the input text, the dialogue system may embed the input text to generate a vector representation for the input text. The vector representations can be generated based on machine learning models that have been trained on training data.

Each extracted clause can be embedded and compared to generate a vector representation of the clause (which will be referred to hereinafter as the clause vector representation) to other vector representations stored in a database. The other vector representations represent predefined inputs that the user may utilise (e.g., predefined answers to a question posed by the dialogue system). The dialogue system determines whether the input vector representation is similar to other vector representations within the database.

A variety of similarity metrics can be used when comparing two sets of words. For instance, an average similarity can be taken from the similarity between each word in each of the two sets of words being compared. The word to word similarity may be measured using, for instance, cosine or dot product similarity. Alternatively, a similarity score for the overall similarity between the words (the sentence similarity) can be determined (e.g., using the Jaccard similarity coefficient).

In an embodiment, if the clause vector representation is determined to be similar to one of the vector representations, then this clause vector representation is selected as the user's input. Each clause vector is compared to the potential inputs in order to match the clauses to determine multiple inputs from the user's initial overall input. One or more responses are then implemented corresponding to the selected inputs. For instance, in the system of FIG. 1, the diagnosis engine determines either a diagnosis based on the inputs, or a further question that will reduce the uncertainty in the system. Alternatively, in an information extraction system, the response may be the storage of information relating to each clause (e.g., a semantic triple for each clause).

---

Algorithm 1 ANSWERMATCHING

---

Require: Utterance u; question with set of answers A; text similarity function s; threshold $\theta \in [0, 1]$
Ensure: Set of matched answers M
    $U \leftarrow$ SEMANTICGRAPHTRAVERSAL(u)
    $M \leftarrow \emptyset$
    for $u_i \theta \in U$ do
        $S \leftarrow \{s(u_i, a_j) \mid a_j \in A\}$
        $s_*, a_* \leftarrow \max_{a_j \in A} S, \text{argmax}_{a_j \in A} S$
        if $s_* > \theta$ then
            $M \leftarrow M \cup \{a_*\}$
        end if
    end for

---

Algorithm 1 shows a method of matching an input with one or more of a set of predefined options.

The method begins by receiving an input (in this case, an utterance) in response to a question that has a predefined set of potential answers ($a_j \in A$). The method forms a semantic graph of the utterance and performs semantic graph traversal (as shall be described below) to extract each sub-clause ($u_i$) from within the input to form a set of sub-clauses (U). For each sub-clause $u_i$, the method determines the similarity with respect to each of the potential answers ($a_j$). The largest similarity value for the sub-clause is selected, along with the corresponding answer. If the largest similarity value is greater than a predefined threshold, then it is added to a set of matched answers (M). After each sub-clause has been considered, then the set of matched answers for the input is output.

It should be noted that the method of extracting sub-clauses is independent of the method in which the sub-clauses may be matched to specific answers. For instance, Algorithm 1 selects the largest similarity value for each sub-clause, whereas an alternative embodiment may select any similarity value that exceeds a predetermined threshold and then perform disambiguation to determine an appropriate match from these selections. This disambiguation may include determining further similarity values using a different similarity metric and/or requesting clarification from the user.

Note that in simple cases, the inferred clauses could be constructed from the syntax alone; in fact, the problem is related to what is known in linguistics as coordination reduction (or conjunction reduction), since coordinated clauses are a common way of expressing multiple intents in a single sentence (for example, "The back and right side of my head hurt"). However, it is not the only way inferred clauses are manifested (consider "The back of my head hurts, and so does the right side"), which is why semantics generally, and SRL paired with argument splitting and verb chaining in particular, is an important component of the system. This allows inferred clauses to be extracted more accurately from more complex input sentences without requiring specifically trained machine learning classifiers.

Multiple Input Recognition

As discussed above, it is important to be able to recognise multiple inputs (multiple intents) within a single natural language input (e.g., a given sentence) so that the inputs can be processed effectively. For instance, in a dialogue system, some multiple choice questions may allow more than one answer. Alternatively, a user may input multiple independent concepts in a single statement. This situation would be tricky to detect using matching using semantic similarity, since a textual statement containing multiple answers will not necessarily be similar to the text of either answer on its own.

For example, a potential question (by a dialogue system) and corresponding answer (from the user) might be:

Q: Where is the pain in your head?
A: "It hurts at the back and on the right side."

This user input might not be semantically similar to answers like "At the back of my head" or "on one side," but it clearly contains both of those meanings implicitly. To obtain these meanings, the input utterance can be split into multiple inferred clauses.

To formalise the goal of detecting multiple answers expressed in a single input, known more generally as multiple intent recognition, we first define the inferred clauses of a sentence. These are the simplest complete semantic frames such that, if you enumerate them and connect them with the appropriate conjunctions, you recover the meaning of the original sentence. For instance, the above example answer can be decomposed into the inferred clauses "it hurts at the back" and "it hurts on the right side."

Once an input (or utterance) is decomposed into its inferred clauses, inferred clauses can be processed relatively independently. For instance, in a dialogue system using semantic similarity matching, the semantic similarity may be calculated between each of those clauses and the expected answers to the question (the predefined inputs), in exactly the same way as if only a single clause was input.

Segmenting the user utterance into simpler, self-contained structures like inferred clauses can help with the extraction relevant information from each, as well as "mix and match" information extraction and answer matching for each of the clauses.

Figure 5A:
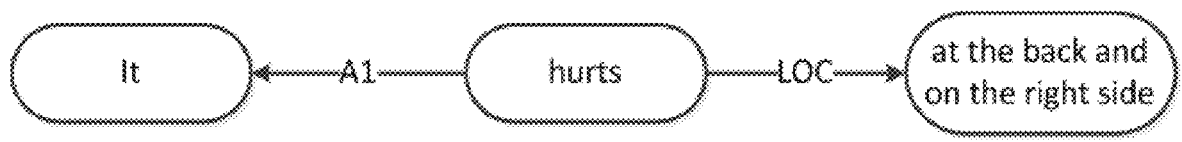
FIG. 5A shows an example of a shallow semantic graph formed based on semantic role labelling (SRL) for the sentence "it hurts at the back and on the right side"

To demonstrate the problem, FIG. 5A shows an example of a shallow semantic graph formed based on semantic role labelling (SRL) for the sentence "it hurts at the back and on the right side." As described herein, this is unable to separate conjunctions, and instead produces a combined argument modifier of "at the back and on the right side."

In light of this, the improved semantic graphs described herein are utilised. The semantic relationships that are determined from the input text are similar to those determined in semantic role labelling (SRL); however, the formalism used is more flexible and generates more complex graphs. Whilst SRL is limited to determining relationships between a verb and other words, the present formalism can determine relationships between non-verbs (e.g., between nouns), can link multiple verbs together (e.g., verb chains) and can split conjunctions to provide finer granularity. The output is a semantic dependency graph such as that shown in FIG. 5B.

Figure 5B:
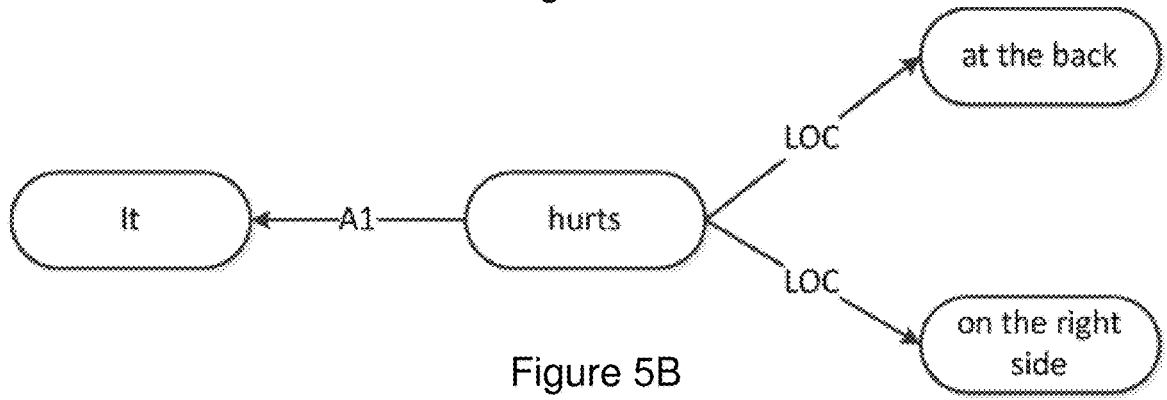
FIG. 5B shows an improved semantic graph for the sentence of FIG. 5A making use of conjunction splitting.

FIG. 5B shows an improved semantic graph for the sentence "it hurts at the back and on the right side." The graph consists of a number of nodes connected by edges. The nodes represent different semantic groupings of one or more words taken from the original input text. The edges represent the semantic relationship between each group. Each pair of groups that is related is connected via an edge.

In the present embodiment, the graph is built around a root verb. This is the verb (e.g., the action state or occurrence) that forms the core of the input statement. In this case, the root verb is "hurts." This therefore forms the central node. The root verb is connected to a number of semantic groups. In the present case, three semantic groups are connected to the root verb. A first group contains the word "it." This is assigned the semantic role A1 corresponding to the proto-patient. The other two groups of words are "at the back" and "on the right side." These are assigned the role location corresponding to the location of the pain. As these last two groups relate to separate locations, they are separate groups. Unlike the graph of FIG. 5A, the conjunction in the input text is split to produce two separate location nodes. Whilst this graph is built around one root verb, if multiple verbs are contained within the user input, then these can be chained together to form a more complex graph containing multiple verbs.

Different clauses can be extracted from the input text based on the semantic graph. An inferred clause is defined as any clause that can be constructed from a given sentence by starting with a root of the sentence (e.g., a root verb) and adding at most one element from each of its semantic roles, including adverbs and other modifiers. Generally speaking, the inferred clauses are the simplest syntactically complete sentences such that if you enumerate them and connect them with the appropriate conjunctions, you recover the meaning of the original sentence.

Note that this is closely related to what is known in linguistics as coordination reduction, since coordinated clauses are a common way of expressing multiple intents in a single sentence. However, it is not the only way inferred clauses are manifested (consider "The back of my head hurts, and so does the right side").

Figure 5C:
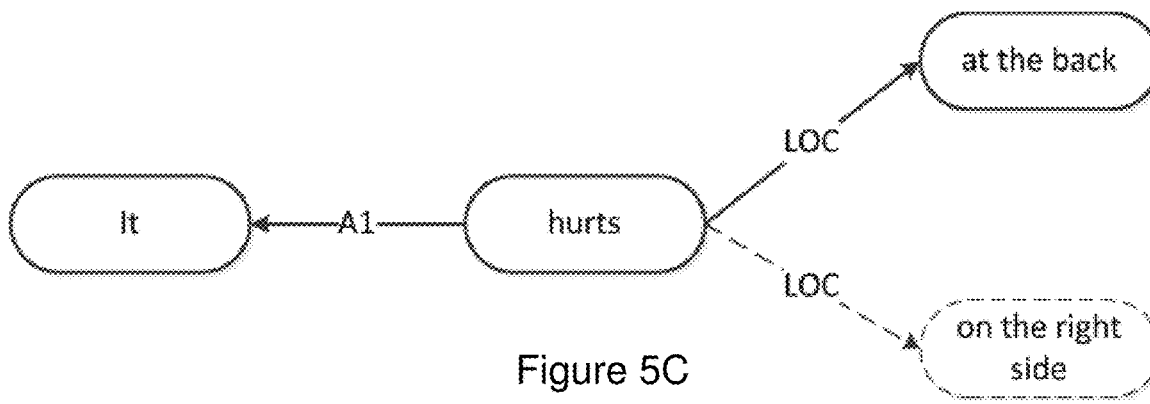
FIG. 5C shows a first inferred clause extracted from the graph of FIG. 5B.

FIG. 5C shows a first inferred clause extracted from the graph of FIG. 5B. The extracted section of the graph not falling within the first inferred clause is depicted with a dashed line. In this case, the clause "it hurts at the back" is extracted by combining the agent ("it") and the position ("at the back") with the root verb ("hurts").

Figure 5D:
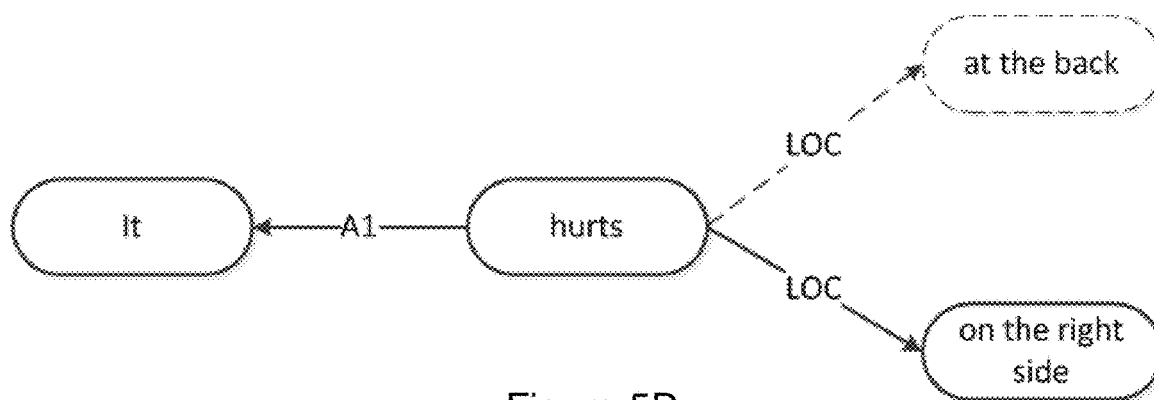
FIG. 5D shows a second inferred clause extracted from the graph of FIG. 5B.

FIG. 5D shows a second inferred clause extracted from the graph of FIG. 5B. The extracted section of the graph not falling within the second inferred clause is depicted with a dashed line. In this case, the clause "it hurts on the right side" is extracted by combining the agent ("it") and the position ("on the right side") with the root verb ("hurts").

Once an utterance is decomposed into its inferred clauses, the system can process each inferred clause and determine an appropriate response. Segmenting the user utterance into simpler self-contained structures like inferred clauses can help with the extraction of relevant information from each, as well as "mix and match" information extraction and answer matching for each of the clauses.

To achieve the above, the present embodiment employs a traversal algorithm over the semantic graph to find paths corresponding to inferred clauses. The algorithm starts at the root node(s) (e.g., the root verb(s)) and recursively builds up candidate clauses by adding words corresponding to semantic roles and bifurcating the candidate set if the semantic role has been encountered before.

---

Algorithm 2 SEMANTICGRAPHTRAVERSAL

---

Require: Utterance u
Ensure: Set of inferred clauses C
    $G \leftarrow$ Semantic graph of u
    $V \leftarrow$ Root verbs in G
    $C \leftarrow \cup_{v \in V}$ RECURSIVETRAVERSAL(G, v)

---

Algorithm 2 is called by Algorithm 1. In Algorithm 2, the set of inferred clauses, C, is determined from an input utterance u. Firstly, a semantic parse of u is performed in order to group and label words within the utterance in accordance with their corresponding semantic roles. Each word within the input is tagged with a label according to its semantic role within the input (its semantic relationship to one or more other words within the input). Each contiguous set of words that has the same semantic role is grouped together to form a node. This extracts groups of words that belong to the same semantic group (such as agent, goal, result, verb, etc.) and the relationships between these groups. The set of labelled semantic groups is G. The relationships and labelling allow a semantic graph to be determined for the input. The set V of one or more root nodes v is determined from the graph G. The semantic graph is an acyclic directional graph. Each edge has a direction associated with it, conveying the semantic dependency between the corresponding nodes. The root nodes are the one or more nodes within the graph that have no incoming edges (that have no parents within the graph). These root nodes may represent the root verb within the sentence or, if the input does not include any verbs, may be any other form of root node.

Then, for each root v, Algorithm 3 is performed in order to determine the set of one or more inferred clauses $C_v$ for that root v. Naturally, whilst the aim of this algorithm is to detect multiple clauses, where they exist, not all utterances will contain multiple inferred clauses per root, or even multiple roots. Nevertheless, the present method is able to extract these multiple pieces of information where they exist.

In Algorithm 3, the set of one or more inferred clauses $C_v$ for a given root v is determined. This makes use of the semantic graph determined in Algorithm 2.

---

Algorithm 3 RECURSIVETRAVERSAL

---

Require: Semantic graph G, root $v$
Ensure: Set of inferred clauses for this root $C_v$
    $D_v \leftarrow \emptyset$
    $D_v [\text{ROOT}] \leftarrow \{v\}$
    for $s \in$ SUCCESSORS(G, $v$) do
        $r \leftarrow$ Semantic role between $v$ and s  # or other edge label,
ignoring conjunction
        $C_s \leftarrow$ RECURSIVETRAVERSAL(G,s)
        $D_v[r] \leftarrow D_v[r] \cup C_s$
    end for
    # assume we have a syntax-sensitive word/phrase combination method
    $C_v \leftarrow \{\text{STRINGCONCAT}(c) \mid c \in \Pi_{r \in D_v} D_v[r]\}$

---

Algorithm 3 traverses the semantic graph G once for each root v, producing a set of one or more inferred clauses $C_v$ for each root v.

The method starts by setting a dictionary for the root $D_v$ to zero. The dictionary $D_v$, once constructed, provides a mapping between each semantic relationship associated with the given node v and the potential spans of words that fall within that relationship. In other words, the dictionary groups and the spans associated with node v and its children in terms of their semantic role within the relationship with node v.

At the next step, the span of word(s) corresponding to the root node v for this parse is added to the dictionary $D_v$ under the semantic role "root." This therefore records the span of word(s) for the root and the fact that the span forms the root.

The span for node v itself is labelled as the "Root," even if the node itself is not necessarily the root of the whole semantic graph (e.g., when Algorithm 3 is called for a node that isn't the root, as discussed below), as it is considered the root of the subtree for node v that is being considered at this point.

The method then determines the number of successors (dependent nodes) for the root v. Successors of a node are any child nodes of the node, that is, any nodes that are connected to the (parent) node by an outgoing edge.

If there are no successors, then the parse for this root ends, setting the inferred clause $C_v$ as equal to the concatenation of the words in the dictionary for the root.

If there are successors, then for each successor s, another version of Algorithm 3 is called in order to build up a dictionary $D_s$ for the successor node s and determine a corresponding set of one or more inferred clauses $C_s$ for the successor node s. As each instance of a successor node calls a further version of Algorithm 3, the method rapidly works its way to the leaf nodes that are descendants of the root node v.

The inferred clauses (or candidate clauses) $C_s$ are built from the leaf nodes upwards. Beginning at the leaf nodes, an inferred clause for each leaf node is determined to be equal to the span associated with said leaf node.

Moving to the parent of a given leaf node, the inferred clause for the leaf node is stored in the dictionary for the parent under the label associated with the semantic relationship of the leaf node relative to the parent. The inferred clauses for all successors of the parent are stored within the corresponding dictionary for the parent. If there are multiple successors that have the same semantic relationship with the parent, then the inferred clauses for these successors are stored as separate entries associated with the given semantic relationship (i.e., the dictionary includes, for each semantic role, the set of inferred clauses for child nodes having the given semantic role relative to the parent).

A set of one or more inferred clauses for the parent node is then determined. The inferred clauses for the parent node are determined by performing the Cartesian product on the inferred clauses (spans) stored in the dictionary for the parent node. This determines every combination of spans, where exactly one span is taken from each of the semantic relationships stored in the dictionary for the parent node. Each combination of spans is concatenated and added to the set of inferred clauses for the parent node. The spans for a combination are combined such that the syntactic relationship between the spans is maintained. That is, the spans are combined in order to have a syntactic dependency that corresponds to the dependencies of the equivalent spans in the original input.

Once an inferred clause for a parent node is determined, the method moves up the graph to the parent of the parent (the grand parent) and repeats the steps updating the dictionary for that node and determining a set of one or more inferred clauses for that node. In this manner, the method traverses the graph from the leaf nodes upwards, building a set of inferred clauses, where a new inferred clause is generated each time a parent node has more than one instance of a given semantic role.

Once the traversal algorithm has reached the root node, the set of inferred clauses for the root node is output. Where a graph has multiple roots, the inferred clauses for the whole graph is the combination of the sets of inferred clauses for each root.

It should be noted that the traversal algorithm ignores conjunction edges. This ensures that each conjunction forms two separate clauses.

In light of the above, the methods described herein produce inferred clauses from an input by forming every potential combination of nodes in which exactly one node for each semantic role for each parent node has been selected (and wherein the combination still forms a contiguous chain of semantically linked nodes), and then concatenating the words associated with the selected nodes.

The traversal method can be considered to implement a process of merging nodes from the leaf nodes into the root node. To help demonstrate this, FIGS. 6A-6C show an initial semantic graph, an intermediate form of the semantic graph after one round of merging, and a final output detailing a set of inferred clauses.

Specifically, FIG. 6A shows a semantic graph for the sentence "Mary and I want to eat salad and drink soda." A root node is formed for the root verb "want." Outgoing A0 edges connect the root node to nodes for "Mary" and "I," with a conjunction edge connecting "Mary" to "I." An outgoing chain edge connects the root node to respective nodes for the verbs "eat" and "drink." The verb node for "drink" is connected via an outgoing A1 edge to a noun node for "soda." Two outgoing A1 edges connect the verb node for "eat" to respective noun nodes for "salad" and "pizza." A conjunction edge connects the node for "salad" and to the node for "pizza."

FIG. 6B shows in intermediate form of the semantic graph of FIG. 6A during the determination of inferred clauses. As described above, the method of determining inferred clauses traverses the semantic graph from the leaf nodes inwards, effectively combining child nodes with their corresponding parent node. Each time a parent has multiple child nodes sharing the same semantic role, separate combinations of the parent and child nodes are formed for each child node having that semantic role.

In the example of FIG. 6A, the verb node for "eat" has two child nodes that share the same semantic role "A1." In this case, the eat node is divided into two, with each division being combined with a respective one of the two "A1" nodes. This forms an "eat pizza" node and an "eat salad" node having the same semantic role as the original parent node (being a chain verb node that is dependent on the root verb "want").

FIG. 6C shows a set of inferred clauses determined from the semantic graph of FIG. 6A. This is effectively formed by producing every combination of the nodes of FIG. 6B, where for each parent node, only one node from each semantic role relative to the root is chosen. Accordingly, a set of six inferred clauses is determined. The A0 noun node "Mary" is combined with "want" and an inferred clause is formed for each of the chain verb inferred clauses "eat salad," "eat pizza," and "drink soda." This produces "Mary want eat salad," "Mary want eat pizza," and "Mary want drink soda." The same is performed for the A0 noun node "I" to produce the inferred clauses "I want eat salad," "I want eat pizza," and "I want drink soda." In the present example, the infinitive marker "to" in this case is excluded, as it is not necessary to determine the semantic meaning of the sentence, but may be included in alternative embodiments.

The example of FIGS. 6A-6C shall now be described with reference to the performance of Algorithm 3.

In a first step, the method traverses from the root node down to the leaf nodes. The corresponding span for each leaf node is recorded in the dictionary for that node as the root (e.g. $D_{salad}$={ROOT:[salad]}). The inferred clause for each root node is then determined. The determination of the inferred clauses includes the step of concatenating any child nodes with the current node. Having said this, in this first step, the leaf nodes have no child nodes. Accordingly, the inferred clause for each leaf node simply consists of the span for that node (e.g. $C_{salad}$=[salad]).

In the next step, the inferred clauses for the leaf nodes are used to update the dictionary for each parent of the leaf nodes and then determine inferred clauses for each parent node. The parent node can only be updated once the inferred clauses for each of its children have been determined. In the present case, as the inferred clauses for the "eat" and "drink" nodes have not been determined, the inferred clause for "want" cannot be produced, so the combinations of the "Mary" and "I" nodes with "want" cannot be performed yet. Instead, the combinations of "salad," "pizza," and "soda" with parent nodes "eat" and "drink" need to be performed first (to produce the graph of FIG. 6B).

At this step, the dictionary for each parent node is updated. This includes adding the span for that node as the root within the dictionary, and adding the inferred clauses for each child node as an entry mapped to the semantic role of the respective child node:

$D_{eat}$={ROOT:[eat],A1:[salad,pizza]}

$D_{drink}$={ROOT:[drink],A1:[soda]}

The set of inferred clauses for each parent node is then determined by selecting every combination of child nodes, where only one child node is selected per semantic role, and for each combination, concatenating the inferred clauses for the selected child nodes with the span for the parent node.

The concatenation includes spaces between each span. The concatenation also reflects the syntactic dependencies of the original input text. That is, the spans for each combination are combined in an order that reproduces the syntax for those spans within the input text.

Via the above method, a set of one or more inferred clauses for the parent node are determined, wherein a separate inferred clause is determined each time that a child node shares a semantic role with a sibling (another child node of its parent node). This can be achieved by taking the Cartesian product across the sets of spans within the dictionary for each parent node (each set of spans representing the set of inferred clauses within the dictionary corresponding to a particular semantic role). In the present example, this produces the inferred clauses:

$C_{eat}$=[eat salad,eat pizza]

$C_{drink}$=[drink soda]

This set of inferred clauses is depicted in FIG. 6B.

This method is then repeated for the parent of the parent nodes until the root node is reached and the inferred clauses for the root node are determined. In the present case, the dictionary for the root verb "want" is updated to become:

$D_{want}$={ROOT:[want],A0:[Mary,I],CHAIN:[eat salad, eat pizza,drink soda]} and the set of inferred clauses for the verb want is:

$C_{want}$=[Mary want eat salad,Mary want eat pizza, Mary want drink soda,I want eat salad,I want eat pizza,I want drink soda]

The method is repeated for each root within the semantic graph (in the present example there is only one root). Finally, the determined inferred clauses for each root are output.

Using the methods described herein, it is therefore possible to extract multiple different intents (multiple inferred clauses) from a single natural language input by traversing the semantic graph.

One downside of this approach is that it depends on the output of a semantic parser (i.e., the formation of the semantic graph), which is itself a challenging problem. Ideally, the semantic graph needs to accurately handle conjunctions, auxiliary verbs, chains of verbs, and argument modifiers.

Nevertheless, by extracting multiple inferred clauses based on semantic graphs, the present approach avoids the need for specifically trained classifiers for identifying specific intents. This therefore allows a wider variety of intents to be detected without the need for large amounts of training data. Equally, this results in a system that is much more computationally efficient, requiring less data storage relative to complex machine learning models.

Information Extraction

As mentioned above, the semantic graph may be utilised to extract phrases or clauses from the input text and determine a response as part of a dialogue system. Alternatively, the semantic graph may be utilised in an information extraction process to extract semantic triples for storage in a knowledge base, such as a medical knowledge base used by a diagnostic system. This allows semantic relationships (e.g., links between diseases and symptoms) to be extracted automatically from unstructured text (such as medical textbooks).

The unstructured text may be split into sentences, with a semantic graph being formed for each sentence using the methods described herein. Once a semantic graph has been formed, the semantic graph may be parsed in order to extract semantic triples, that is, binary relations (including a subject, an object, and a relationship between the subject and object).

Focus is made on arguments of types ARG0, ARG1, and ARG2, since these roughly correspond to the thematic roles of PROTO-AGENT, PROTO-PATIENT, and INSTRUMENT, respectively, and hence capture the semantic triples in the sense that some medical entity (disease, symptom, drug, organism) is causing some event or action to some other entity. The electronic data defining the graph is retrieved and the SRL-graph is scanned to extract triples (binary relations).

Once the triple has been obtained, the elements of the semantic triple are stored in the memory as electronic data. Still, the processor retrieves the electronic data defining the elements of the semantic triple and associates them with entities (a concept or properties) from the knowledge base 13 (see FIG. 1) by selecting proper Internationalized Resource Identifiers (IRIs). IRIs are specific strings of characters that unambiguously identify a particular resource. The associated IRIs are stored as electronic data in the memory.

Once the semantic triples are stored, they can be accessed at a later date as part of informing future decisions based on the knowledge base. For instance, in a diagnostic system, the triples can represent an association between a medical condition and a medical symptom. The triples can be accessed and analysed when a set of symptoms have been input in order to determine a corresponding medical condition (or set of potential medical conditions with associated likelihoods).

Computing System

Figure 7:
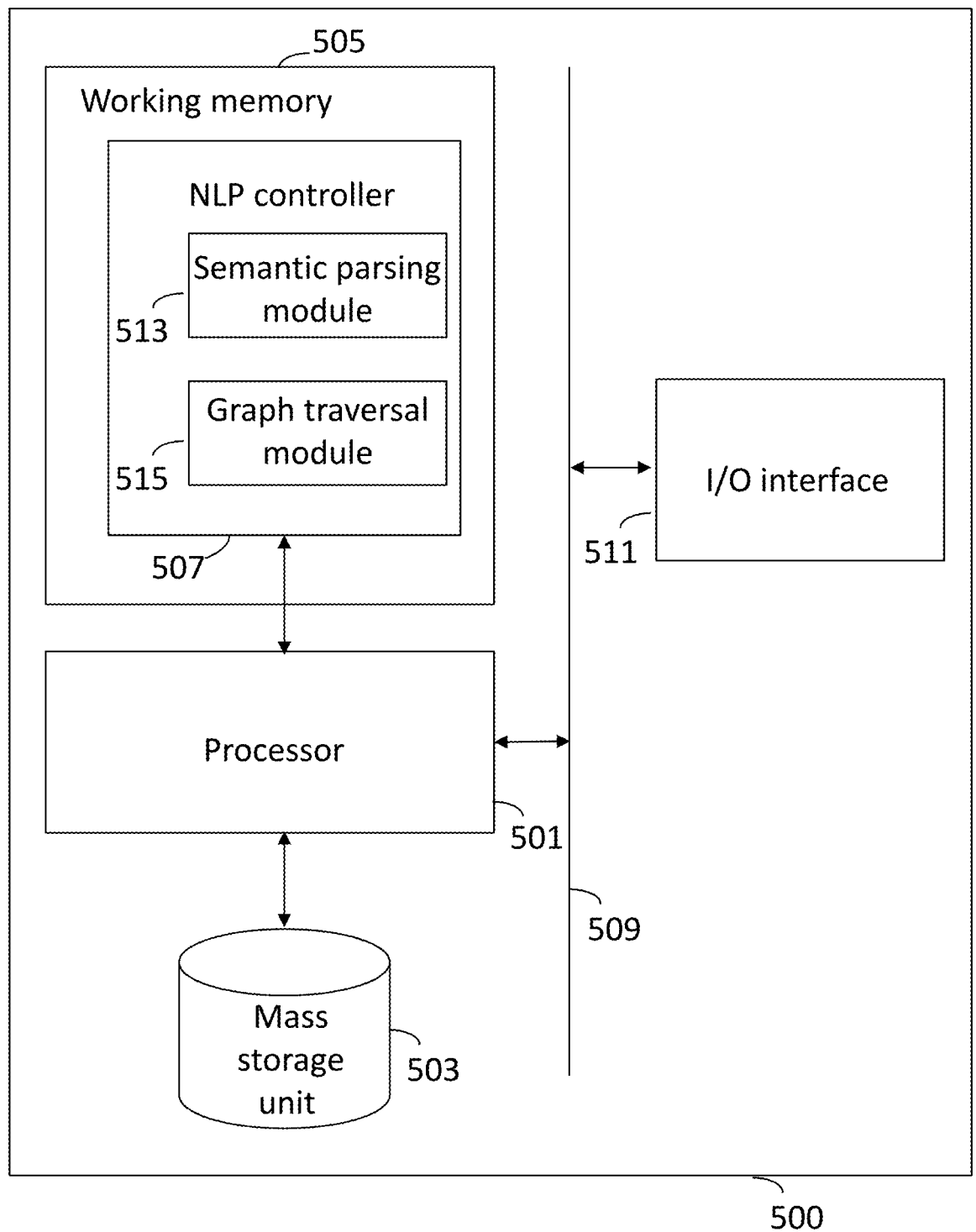
FIG. 7 shows a computing system for implementing the methods described herein, according to an embodiment.

While the reader will appreciate that the above embodiments are applicable to any commuting system for recognising user inputs, a typical computing system is illustrated in FIG. 7, which provides means capable of putting an embodiment, as described herein, into effect. As illustrated, the computing system 500 comprises a processor 501 coupled to a mass storage unit 503 and accessing a working memory 505. As illustrated, a natural language processing (NLP) controller 507 is represented as a software product stored in working memory 505. However, it will be appreciated that elements of the NLP controller 507 may, for convenience, be stored in the mass storage unit 503.

Usual procedures for the loading of software into memory and the storage of data in the mass storage unit 503 apply. The processor 501 also accesses, via bus 509, an input/output interface 511 that is configured to receive data from and output data to an external system (e.g., an external network or a user input or output device). The input/output interface 511 may be a single component or may be divided into a separate input interface and a separate output interface.

The NLP controller 507 includes a semantic parsing module 513 and a graph traversal module 515. The semantic parsing module is configured to determine the semantic relationship between the words in an input set of words and form a sematic graph. The graph traversal module is also configured to extract one or more inferred clauses from the input set of words using the semantic graph. The input words may be received as text in machine-readable format or may be determined from an audio signal via automatic speech recognition. Thus, execution of the NLP software 507 by the processor 501 will cause embodiments as described herein to be implemented.

The NLP controller 507 may be configured to determine whether the input of one or more words match any of the predefined inputs stored in the mass storage unit 503 and to output a response to the user input as described herein in order to simulate a conversation according to the predefined conversation flow. The user input may be embedded as a set of one or more word embeddings for processing by NLP controller 507.

In an alternative embodiment, the NLP controller 507 includes an information extraction module. This extracts semantic triples from the input text, either for matching with information in a knowledge base, or for storing (e.g., in order to build up a knowledge base).

The NLP controller software 507 can be embedded in original equipment, or can be provided, as a whole or in part, after manufacture. For instance, the NLP controller software 507 can be introduced, as a whole, as a computer program product, which may be in the form of a download, or to be introduced via a computer program storage medium, such as an optical disk. Alternatively, modifications to an existing NLP controller 507 can be made by an update, or plug-in, to provide features of the above described embodiment.

The computing system 500 may be an end-user system that receives inputs from a user (e.g., via a keyboard or microphone) and determines responses to the inputs based on the similarity of the inputs to predefined inputs. Alternatively, the system may be a server that receives input over a network and determines the response which is then conveyed back to the user device. Either way, the system is configured to determine a response user input to implement a conversation flow, as discussed herein.

The mass storage unit 503 may store predefined inputs and corresponding responses to those inputs for use in a dialogue flow. The NLP controller 507 may be configured to determine similarity values with respect to an input phrase relative to each of the predefined phrases for the current state of the system (the current position within a predefined dialogue flow). The system may then determine the most similar predefined phrase and then respond with the corresponding predefined response that is associated with that predefined phrase. The predefined phrases may be stored as sets of embedding vectors.

In addition, the mass storage unit 503 may be configured to store semantic triples, either those extracted from input text, or preloaded into the system for use when handling input text (e.g., handling information retrieval requests or determining inferred information from the input text).

The methods described herein provide a means for extracting multiple intents from a single natural language input for use in natural language processing systems such as dialogue systems or information extraction systems. The embodiments described herein avoid the use of specifically trained classifiers by extracting inferred clauses based on a semantic graph of the input. This allows the embodiments to work over a variety of language subject matters and provides methods and systems that are more computationally efficient by avoiding the need to train the system using a large number of labelled training data.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions, and changes to the specific implementations described herein may be made without departing from the scope of protection defined in the following claims.

The invention claimed is:

1. A computer-implemented natural language processing method comprising:
   obtaining a semantic graph representing semantic meaning of an initial set of words; and
   determining, from the semantic graph, an inferred clause, including:
      selecting a root node from the semantic graph;
      selecting a combination of nodes including the root node and a set of descendants of the root node such that the nodes within the combination form a contiguous series of connected nodes within the semantic graph and wherein, for each parent node that is a descendent of the root node, only one child node is selected for each type of semantic relationship that the parent node has with its one or more child nodes; and
      forming the inferred clause from the selected nodes.

2. The method of claim 1 further comprising, each time a parent node has multiple child nodes having the same semantic relationship, for each additional child node having the same semantic relationship, selecting a further combination of nodes for a further inferred clause, the further combination including the respective parent node and the respective additional child node.

3. The method of claim 1 further comprising repeating selecting a root node, selecting a combination of nodes, and forming the inferred clause for each root node in the semantic graph.

4. The method of claim 1 wherein the semantic graph comprises:
   a plurality of nodes, each node representing a span of one or more words taken from the initial set of words and having a corresponding shared semantic role within the initial set of words; and one or more edges, each edge connecting semantically linked nodes and each edge being labelled with a corresponding semantic relationship, wherein the semantic graph forms a tree having one or more root nodes and one or more leaf nodes.

5. The method of claim 4 wherein the method comprises forming a set of one or more inferred clauses for the root node, including:
   determining every possible combination of the root node and its descendants, wherein each combination is selected such that the nodes within the combination form a contiguous series of connected nodes within the semantic graph and wherein every possible descendent of the root node from the semantic graph is selected with the exception that, for each parent node that is a descendent of the root node, only one child node is selected for each type of semantic relationship that the parent node has with its one or more child nodes; and
   forming the set of one or more inferred clauses for the root node by combining the spans for each determined combination.

6. The method of claim 5, wherein forming a set of one or more inferred clauses for the root node includes:
   for each leaf node that is a descendent of the respective root node, setting an inferred clause for that leaf node to include the span for that leaf node; and
   for each parent node within the semantic graph, starting from the one or more parent nodes of the respective leaf nodes and moving up the semantic graph to the respective root node, determining a set of one or more inferred clauses for the respective parent node by:
      determining each possible combination of the respective parent node and the one or more child nodes of the respective parent node, where only one child node is selected for each semantic relationship relative to the respective parent node; and
      for each combination of the respective parent node and the one or more child nodes of the respective parent node, combining the spans for the combination to form an inferred clause for the respective parent node.

7. The method of claim 6, wherein determining each possible combination of the respective parent node and the one or more child nodes of the respective parent node comprises grouping the respective parent node and the one or more child nodes according to their semantic role and determining the Cartesian product across the groups.

8. The method of claim 5, wherein combining the spans for each determined combination comprises, for each determined combination, forming a span that includes each of the spans for each node within the combination.

9. The method of claim 1 further comprising:
   determining a response to the initial set of words based on the inferred clause; and
   outputting the determined response.

10. The method of claim 9, wherein determining a response to the initial set of words comprises:
    determining an input corresponding to the inferred clause; and
    determining the response based on the determined input.

11. The method of claim 10, wherein determining an input corresponding to the inferred clause comprises:
    for each of a set of predefined inputs, determining a semantic similarity between the inferred clause and the predefined input; and
    selecting a corresponding predefined input based on the determined semantic similarities for the inferred clause.

12. The method of claim 10, wherein determining an input corresponding to the inferred clause comprises applying a classifier to the inferred clause and selecting the input based on an output of the classifier.

13. The method of claim 1, wherein the semantic graph includes one or more semantic relationships that have a subject component, wherein the subject component is not constrained to be a verb node and one or more semantic relationships that have an object component, wherein the object component may be a verb node.

14. The method of claim 1, wherein the semantic graph represents one or more semantic relationships including one or more of:
    a conjunction between two noun nodes or two argument modifier nodes;
    a combination of an auxiliary verb and a corresponding main verb or a corresponding further auxiliary verb;
    an argument modifier node being an argument modifier for a noun node; and
    a chain of verb nodes.

15. The method of claim 14, wherein the one or more semantic relationships include a conjunction between two noun nodes or two argument modifier nodes and wherein any edges representing conjunctions within the semantic graph are ignored when forming the inferred clause from the selected nodes.

16. A system including a processor and a memory, the memory including instructions that, when executed by the processor, cause the processor to perform:
    obtaining a semantic graph representing semantic meaning of an initial set of words; and determining, from the semantic graph, an inferred clause, including:

selecting a root node from the semantic graph;

selecting a combination of nodes including the root node and a set of descendants of the root node such that the nodes within the combination form a contiguous series of connected nodes within the semantic graph and wherein, for each parent node that is a descendent of the root node, only one child node is selected for each type of semantic relationship that the parent node has with its one or more child nodes; and forming the inferred clause from the selected nodes.

17. The system of claim 16, wherein the processor further performs, each time a parent node has multiple child nodes having the same semantic relationship, for each additional child node having the same semantic relationship:

selecting a further combination of nodes for a further inferred clause, the further combination including the respective parent node and the respective additional child node.

18. The system of claim 16, wherein the processor further performs:

repeating selecting a root node, selecting a combination of nodes, and forming the inferred clause for each root node in the semantic graph.

19. The system of claim 16, wherein the semantic graph comprises:

a plurality of nodes, each node representing a span of one or more words taken from the initial set of words and having a corresponding shared semantic role within the initial set of words; and one or more edges, each edge connecting semantically linked nodes and each edge being labelled with a corresponding semantic relationship, wherein the semantic graph forms a tree having one or more root nodes and one or more leaf nodes.

20. A non-transitory computer-readable medium including instructions that, when executed by a processor, cause the processor to perform:

obtaining a semantic graph representing semantic meaning of an initial set of words; and determining, from the semantic graph, an inferred clause, including:

selecting a root node from the semantic graph;

selecting a combination of nodes including the root node and a set of descendants of the root node such that the nodes within the combination form a contiguous series of connected nodes within the semantic graph and wherein, for each parent node that is a descendent of the root node, only one child node is selected for each type of semantic relationship that the parent node has with its one or more child nodes; and forming the inferred clause from the selected nodes.

* * * * *